United States Patent
Bangia et al.

(10) Patent No.: US 12,094,109 B2
(45) Date of Patent: Sep. 17, 2024

(54) IMAGE SCORING FOR INTESTINAL PATHOLOGY

(71) Applicant: Takeda Pharmaceutical Company Limited, Osaka (JP)

(72) Inventors: Uday Veer Manish Bangia, Cambridge, MA (US); Elliot Greenblatt, Cambridge, MA (US); Daniel Alexander Leffler, Newton, MA (US); Jenifer R. Q. W. Siegelman, Newton, MA (US); Ozlem Nurcan Yardibi, Wayland, MA (US)

(73) Assignee: Takeda Pharmaceutical Company Limited, Osaka (JP)

( * ) Notice: Subject to any disclaimer, the term of this patent is extended or adjusted under 35 U.S.C. 154(b) by 596 days.

(21) Appl. No.: 17/286,224

(22) PCT Filed: Oct. 18, 2019

(86) PCT No.: PCT/IB2019/058920
§ 371 (c)(1),
(2) Date: Apr. 16, 2021

(87) PCT Pub. No.: WO2020/079667
PCT Pub. Date: Apr. 23, 2020

(65) Prior Publication Data
US 2021/0358121 A1 Nov. 18, 2021

Related U.S. Application Data

(60) Provisional application No. 62/748,207, filed on Oct. 19, 2018.

(51) Int. Cl.
*G06T 7/00* (2017.01)
*G06F 16/383* (2019.01)
(Continued)

(52) U.S. Cl.
CPC .......... *G06T 7/0012* (2013.01); *G06F 16/383* (2019.01); *G06F 18/21* (2023.01);
(Continued)

(58) Field of Classification Search
CPC . G06T 7/0012; G06T 7/12; G06T 7/13; G06F 16/383; G06F 18/21
See application file for complete search history.

(56) References Cited

U.S. PATENT DOCUMENTS 6,026,322 A * 2/2000 Korenman ............ G09B 5/065
600/547
2007/0255095 A1 11/2007 Gilreath et al.
(Continued)

FOREIGN PATENT DOCUMENTS

EP 1847940 A2 10/2007
JP 2010512173 A 4/2010
(Continued)

OTHER PUBLICATIONS

D. Boschetto, et al. Superpixel-based automatic segmentation of villi in confocal endomicroscopy, 2016 IEEE—EMBS International Conference on Biomedical and Health Informatics (BHI), US, 2016, https://ieeexplore.ieee.org/stamp/stamp.jsp?tp=&arnumber=7455861 (reference showing well-known art).
(Continued)

*Primary Examiner* — Kevin Ky
(74) *Attorney, Agent, or Firm* — HONIGMAN LLP

(57) ABSTRACT

Disclosed herein are computer-implemented method, system, and computer-program product (computer-readable storage medium) embodiments of image scoring for intestinal pathology. An embodiment includes receiving, via at least one processor, an output of an imaging device. The output of the imaging device may include a plurality of image frames forming at least a subset of a set of image
(Continued)

frames depicting an inside surface of a digestive organ of a given patient; and decomposing, via at least one machine learning (ML) algorithm, at least one image frame of the plurality of image frames into a plurality of regions of interest. The at least one region of interest may be defined by determining that an edge value exceeds a predetermined threshold. At least one processor may automatically assign a first score based at least in part on the edge value for each region of interest and automatically shuffle the set of image frames.

20 Claims, 13 Drawing Sheets

(51) Int. Cl.
  *G06F 18/21* (2023.01)
  *G06T 7/12* (2017.01)
  *G06T 7/13* (2017.01)
  *G06V 10/764* (2022.01)
  *G06V 10/82* (2022.01)

(52) U.S. Cl.
  CPC .................. *G06T 7/12* (2017.01); *G06T 7/13* (2017.01); *G06V 10/764* (2022.01); *G06V 10/82* (2022.01); *G06T 2207/10068* (2013.01); *G06T 2207/10072* (2013.01); *G06T 2207/10116* (2013.01); *G06T 2207/30028* (2013.01); *G06T 2207/30092* (2013.01)

(56) References Cited

U.S. PATENT DOCUMENTS

| | | | |
|---|---|---|---|
| 2012/0316421 A1 | 12/2012 | Kumar et al. | |
| 2017/0186154 A1 | 6/2017 | Chi et al. | |
| 2018/0042565 A1* | 2/2018 | Wilson | A61B 6/405 |
| 2018/0225820 A1* | 8/2018 | Liang | G06V 10/82 |
| 2019/0228524 A1* | 7/2019 | Chen | G16H 30/40 |
| 2019/0392944 A1* | 12/2019 | Samset | G16H 30/40 |
| 2021/0170276 A1* | 6/2021 | Hwang | A63F 13/42 |
| 2021/0358121 A1* | 11/2021 | Bangia | G06V 10/764 |
| 2023/0310470 A1* | 10/2023 | Petyaev | A61K 31/122 514/77 |

FOREIGN PATENT DOCUMENTS

| | | |
|---|---|---|
| JP | 201385593 A | 5/2013 |
| WO | WO 2015/164724 A1 | 10/2015 |
| WO | WO 2017/027475 A1 | 2/2017 |

OTHER PUBLICATIONS

T. Okamoto, et al., Classification Method for Real-Time NBI Colorectal Endoscopic Images with CNN features and SVM, Proceedings of DA Symposium 2017 (reference showing well-known art).
Office Action received by the Japenese Patent Office for related Japanese Patent Application No. 2021-521155 dated Oct. 17, 2023, English Translation of the Office Action is provided.
International Search Report from International Application No. PCT/IB2019/058920, dated Dec. 6, 2019.
Written Opinion from International Application No. PCT/IB2019/058920, dated Dec. 6, 2019.

* cited by examiner

IMAGE SCORING FOR INTESTINAL PATHOLOGY

BACKGROUND

For a given intestinal disorder or disease (enteropathy), diagnosis and monitoring of the given enteropathy poses a variety of difficulties depending on how and where symptoms or features of the enteropathy are expressed in a given patient. Certain enteropathies have proven difficult even for experts to diagnose with certainty and consistency. Some examples include Crohn's disease, celiac disease, irritable bowel syndrome, and ulcerative colitis, among others. Such difficulties in diagnosis and monitoring can lead to further problems, not only for individual patients, but also for the medical field: without accurate and reliable ways to diagnose and monitor certain aspects of a given enteropathy, determining efficacy of treatments for the given enteropathy becomes even more difficult, requiring extensive trial and error with subjective measurements, no standard of care, and inconsistent results that may be hit-or-miss.

Advances in endoscopic technologies have enabled retrieval of photographic images inside organs that were not typically visible without more invasive procedures such as surgery or laparoscopy, for example. However, even with imaging equipment to take more images not previously available to researchers and practitioners, numerous obstacles remain in the way of getting more accurate diagnoses and monitoring. For example, new methods of endoscopy may yield some images containing artifacts or low-quality images that may not contain sufficient information on which to base a diagnosis reliably. Also, symptoms or features of enteropathy may be expressed only in subtle ways depending on a given image or on where the given image was taken with respect to the affected organ, other inconsistencies may arise in diagnosis and monitoring. When enterologists (gastroenterologists) or other medical professionals review intestinal images, different reviewers often reach different conclusions despite reviewing the same images. Even the same reviewers reach different conclusions when reviewing the same images in different contexts or at different times.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

BRIEF SUMMARY OF THE DISCLOSURE

Figure 1:
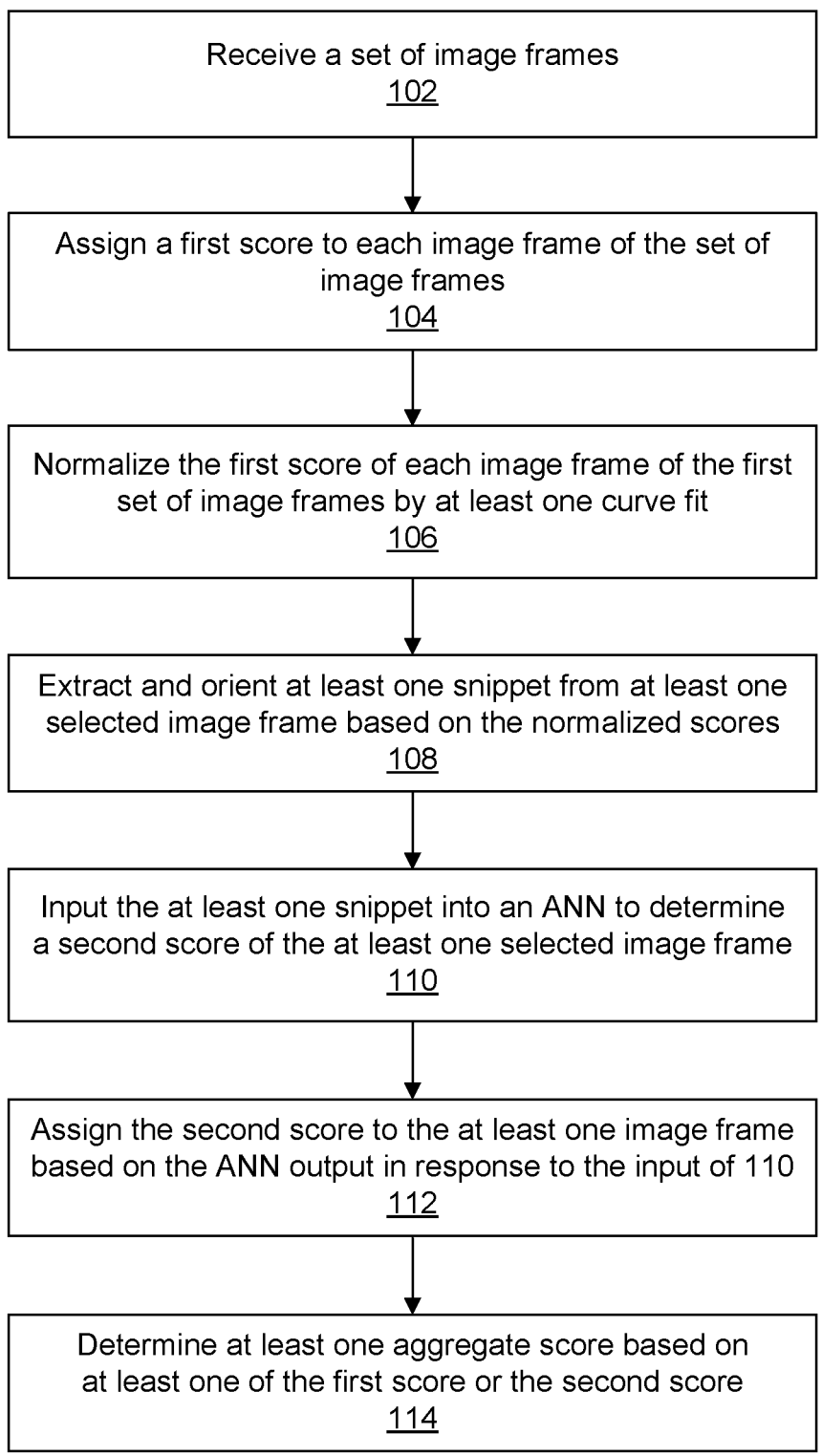
FIG. 1 is a flowchart illustrating a method implementing several aspects of enhanced image processing techniques disclosed herein, according to some embodiments.

Provided herein are examples of system, apparatus, article of manufacture, method, and/or computer program product (non-transitory computer readable medium) embodiments, and/or combinations and sub-combinations thereof, to effect image scoring for intestinal pathology, as described further herein.

One example embodiment may include a computer-implemented method including receiving, via at least one processor, a set of image frames, where at least a subset of the set of image frames depicts an inside surface of a digestive organ of a given patient; and automatically assigning, via the at least one processor, a first score to each image frame of the set of image frames, where the first score corresponds to an informativeness of the image frame with respect to a likelihood of the image frame depicting presence or absence of a given feature on the inside surface of the digestive organ; automatically assigning, via the at least one processor, a second score to each image frame that has the first score within a specified range, where the second score corresponds to a severity of the given feature; and automatically arranging, via the at least one processor, the set of image frames according to at least one of the first score or the second score.

One example embodiment may include the method above, where the arranging includes, with respect to at least one of the first score and the second score, at least one of the following: ranking at least some image frames of the set of image frames in descending order of score; ranking at least some image frames of the set of image frames in ascending order of score; assorting at least some image frames of the set of image frames in random order of score; or positioning at least some image frames of the set of image frames in an array based on adjacent image frames in the array having different scores, where the number of adjacent image frames in the array having different score values meets or exceeds a predetermined threshold.

One example embodiment may include the methods above, further including automatically presenting to a reviewer, by the at least one processor, a first image frame of the set of image frames; and automatically presenting to a reviewer, by the at least one processor, a next image frame of the set of image frames, in the order in which the image frames were automatically arranged.

One example embodiment may include the methods above, further including parsing metadata from each image frame of the set of image frames, where the metadata includes at least one of a timestamp, a position, a relative position within the digestive organ, and at least one image property; and based at least in part on the metadata, automatically selecting, by the at least one processor, at least one of the image frames from the set of image frames.

One example embodiment may include the methods above, where the selecting further includes, for a given image frame: automatically determining, by the at least one processor, at least one of the following: whether the first score or the second score fails to meet a predetermined threshold; whether a visual artifact is determined to be present within the image frame; whether timestamp metadata, position metadata, or relative position metadata indicates that the image frame depicts a sample for which image-based indicators are likely to be unreliable; or whether a relative proximity of the given image frame to another image frame falls below a predetermined proximity threshold based on a difference in time, position, or relative position within the digestive organ; and based on the determining, automatically removing, by the at least one processor, the given image frame from the set of image frames.

One example embodiment may include the methods above, where the removing includes relabeling the image frame such that the image frame is not treated as a member of the set of image frames.

One example embodiment may include the methods above, where the given image frame is selected by at least one of sampling randomly, sampling by time, sampling by position, sampling by frequency, sampling by relative position, sampling by relative proximity, and sampling by change in value of the at least one score.

One example embodiment may include the methods above, where the digestive organ includes at least one of an esophagus, a stomach, a small intestine, and a large intestine.

One example embodiment may include the methods above, where the set of image frames originated from at least one imaging device capable of image production and include at least one of the following: photographic image frames, sonographic image frames, radiographic image frames, confocal image frames, or tomographic image frames.

One example embodiment may include the methods above, where the at least one imaging device includes at least one device selected from the group consisting of an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

One example embodiment may include the methods above, further including: based on the at least one score, automatically generating, by the at least one processor, a diagnosis of a disease with respect to the digestive organ of the given patient.

One example embodiment may include the methods above, where the diagnosis is generated in response to an observation of a reaction of the given patient to an irritant or in response to a treatment administered to the given patient with respect to the disease.

One example embodiment may include the methods above performed with an imaging system (e.g., an endoscope, a video capsule endoscope, etc.), to monitor disease progression or disease improvement, or to quantify an effect of a treatment, such as by tracking a severity score.

One example embodiment may include quantifying, by the at least one processor, severity of at least one small-bowel enteropathy, e.g., celiac disease, tropical sprue, drug-induced enteropathy, protein-losing enteropathy, or dysbiotic enteropathy.

One example embodiment may include the methods above, where the disease includes at least one of Crohn's disease, celiac disease, irritable bowel syndrome, ulcerative colitis, or a combination thereof.

One example embodiment may include the methods above, where the set of image frames includes a plurality of homogeneous images.

One example embodiment may include the methods above, where the assigning of at least the first score and the second score is performed following an algorithm that corresponds to at least one of a pattern-recognition algorithm, a classification algorithm, a machine-learning algorithm, or at least one artificial neural network.

One example embodiment may include the methods above, further including receiving, via the at least one processor, information about the given patient's disease state, medical history, demographics (e.g., age, height, weight, gender, etc.), nutritional habits, and/or lab tests; and passing, via the at least one processor, the information as input to the algorithm.

One example embodiment may include the methods above, where the at least one artificial neural network includes at least one of a feedforward neural network, a recurrent neural network, a modular neural network, or a memory network.

One example embodiment may include the methods above, where the feedforward neural network corresponds to at least one of a convolutional neural network, a probabilistic neural network, a time-delay neural network, a perceptron neural network, or an autoencoder.

One example embodiment may include a computer-implemented method including receiving, via at least one processor, a set of image frames, where at least a subset of the set of image frames depicts an inside surface of a digestive organ of a given patient; automatically extracting, by the at least one processor, at least one region of interest in an image frame of the set of image frames, where the at least one region of interest is defined by determining, by the at least one processor, that an edge value exceeds a predetermined threshold; automatically orienting, by the at least one processor, the at least one region of interest, based at least in part on the edge value; automatically inputting, via the at least one processor, the at least one region of interest into an artificial neural network to determine at least one score corresponding to the image frame, the at least one score representing at least one of informativeness of the image frame to show a given feature affecting the digestive organ or severity of the given feature; and automatically assigning, via the at least one processor, the at least one score to the image frame, based on the output of the artificial neural network in response to the inputting the at least one region of interest.

One example embodiment may include the methods above, further including at least one of automatically removing, by the at least one processor, at least some color data from the at least one region of interest; or automatically converting, by the at least one processor, the at least one region of interest to grayscale.

One example embodiment may include the methods above, further including automatically normalizing, by the at least one processor, at least one image attribute of the at least one region of interest.

One example embodiment may include the methods above, where the at least one image attribute includes intensity.

One example embodiment may include the methods above, where no region of interest in the image frame exceeds twenty-five percent of total area of the image frame.

One example embodiment may include the methods above, where each region of interest in the image frame has identical aspect ratio to any other region of interest in the image frame.

One example embodiment may include the methods above, where the at least one artificial neural network includes at least one of a feedforward neural network, a recurrent neural network, a modular neural network, and a memory network.

One example embodiment may include the methods above, where the feedforward neural network corresponds to at least one of a convolutional neural network, a probabilistic neural network, a time-delay neural network, a perceptron neural network, and an autoencoder.

One example embodiment may include the methods above, further including automatically identifying, by the at least one processor, at least one additional region of interest in an additional image frame of the set of image frames, where the additional image frame and the image frame each represent homogeneous images from the set of image frames; automatically inputting, via the at least one processor, the at least one additional region of interest into the artificial neural network; and automatically assigning, via the at least one processor, at least one additional score to the additional image frame of the set of image frames, based on the output of the artificial neural network in response to the inputting the at least one additional region of interest.

One example embodiment may include the methods above, where the at least one score is determined by at least one decision tree.

One example embodiment may include the methods above, where the at least one decision tree is part of at least one of a random decision forest or a regression random forest One example embodiment may include the methods above, where the at least one decision tree includes at least one classifier.

One example embodiment may include the methods above, further including generating, via the at least one processor, at least one regression based at least in part on the at least one decision tree.

One example embodiment may include the methods above, where the at least one regression includes at least one of the following: a linear model, a cutoff, a weighted curve, a Gaussian function, a Gaussian field, a Bayesian prediction, or a combination thereof.

One example embodiment may include a computer-implemented method including receiving, via at least one processor, a first set of image frames and a corresponding first metadata set for input to a first machine-learning (ML) algorithm; inputting, via the at least one processor, the first set of image frames and the corresponding first metadata set to the first ML algorithm; generating, via the at least one processor, a second set of image frames and a corresponding second metadata set as output from the first ML algorithm, where the second set of image frames corresponds to at least one of a tagged version of the first set of image frames and a modified version of the first set of image frames, and where the second metadata set includes at least one score corresponding to at least one image frame of the second set of image frames; and inputting, via the at least one processor, the second set of image frames and the second metadata set into a second ML algorithm to produce at least one of a refined set of image frames, or refined metadata corresponding to the refined set of image frames.

One example embodiment may include the methods above, where the first ML algorithm and the second ML algorithm belong to different categories of ML algorithms.

One example embodiment may include the methods above, where the first ML algorithm and the second ML algorithm are distinct algorithms of a single category of ML algorithms.

One example embodiment may include the methods above, where the first ML algorithm and the second ML algorithm include different iterations or epochs of the same ML algorithm.

One example embodiment may include the methods above, where the first set of image frames includes a plurality of image frames depicting the digestive organ of the given patient and at least one additional image frame depicting a corresponding digestive organ of at least one other patient.

One example embodiment may include the methods above, further including one of automatically selecting, by the at least one processor, image frames depicting the inside surface of the digestive organ of the given patient, separately from any other image frames; or automatically selecting, by the at least one processor, image frames the subset of the set of image frames that depicts the inside surface of the digestive organ of the given patient, together with the at least one additional image frames corresponding to the digestive organ of the at least one other patient, such that the selected image frames depicting the digestive organ of the given patient are interspersed with the at least one image frame depicting the corresponding digestive organ of the at least one other patient.

One example embodiment may include the methods above, where the second ML algorithm is configured to generate output to be used as input for at least one of the first ML algorithm and a third ML algorithm.

One example embodiment may include a computer-implemented method including receiving, via at least one processor, an output of an imaging device, where the output of the imaging device includes a plurality of image frames forming at least a subset of a set of image frames depicting an inside surface of a digestive organ of a given patient; automatically decomposing, via the at least one processor and at least one machine learning (ML) algorithm, at least one image frame of the plurality of image frames into a plurality of regions of interest, where the at least one region of interest is defined by determining, by the at least one processor, that an edge value exceeds a predetermined threshold; automatically assigning, via the at least one processor, a first score based at least in part on the edge value for each region of interest; automatically shuffling, via the at least one processor, the set of image frames; and outputting, via the at least one processor, an organized presentation of the set of image frames after the shuffling.

One example embodiment may include the methods above, the decomposing further including training, via the at least one processor, the at least one ML algorithm, based at least in part on the outputting.

One example embodiment may include the methods above, the decomposing further including assigning, via the at least one processor, a second score to the organized presentation of the set of image frames.

One example embodiment may include a system including a memory; and at least one processor configured to perform operations including receiving a set of image frames, where at least a subset of the set of image frames depicts an inside surface of a digestive organ of a given patient; and automatically assigning a first score to each image frame of the set of image frames, where the first score corresponds to an informativeness of the image frame with respect to a likelihood of the image frame depicting presence or absence of a given feature on the inside surface of the digestive organ; automatically assigning a second score to each image frame that has the first score within a specified range, where the second score corresponds to a severity of the given feature; and automatically arranging the set of image frames according to at least one of the first score or the second score.

One example embodiment may include the system above, where the arranging includes, with respect to at least one of the first score and the second score, at least one of the following: ranking at least some image frames of the set of image frames in descending order of score; ranking at least some image frames of the set of image frames in ascending order of score; assorting at least some image frames of the set of image frames in random order of score; or positioning at least some image frames of the set of image frames in an array based on adjacent image frames in the array having different scores, where the number of adjacent image frames in the array having different score values meets or exceeds a predetermined threshold.

One example embodiment may include the systems above, where the at least one processor is further configured to perform automatically presenting to a reviewer a first image frame of the set of image frames; and automatically presenting to a reviewer a next image frame of the set of image frames, in the order in which the image frames were automatically arranged.

One example embodiment may include the systems above, where the at least one processor is further configured to perform parsing metadata from each image frame of the set of image frames, where the metadata includes at least one of a timestamp, a position, a relative position within the digestive organ, and at least one image property; and based at least in part on the metadata, automatically selecting at least one of the image frames from the set of image frames.

One example embodiment may include the systems above, where the selecting further includes, for a given image frame: automatically determining at least one of the following: whether the first score or the second score fails to meet a predetermined threshold; whether a visual artifact is determined to be present within the image frame; whether timestamp metadata, position metadata, or relative position metadata indicates that the image frame depicts a sample for which image-based indicators are likely to be unreliable; or whether a relative proximity of the given image frame to another image frame falls below a predetermined proximity threshold based on a difference in time, position, or relative position within the digestive organ; and based on the determining, automatically removing the given image frame from the set of image frames.

One example embodiment may include the systems above, where the removing includes relabeling the image frame such that the image frame is not treated as a member of the set of image frames.

One example embodiment may include the systems above, where the given image frame is selected by at least one of sampling randomly, sampling by time, sampling by position, sampling by frequency, sampling by relative position, sampling by relative proximity, and sampling by change in value of the at least one score.

One example embodiment may include the systems above, where the digestive organ includes at least one of an esophagus, a stomach, a small intestine, and a large intestine.

One example embodiment may include the systems above, where the set of image frames originated from at least one imaging device capable of image production and include at least one of the following: photographic image frames, sonographic image frames, radiographic image frames, confocal image frames, or tomographic image frames.

One example embodiment may include the systems above, where the imaging device includes at least one device selected from the group consisting of an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

One example embodiment may include the systems above, where the at least one processor is further configured to perform: based on the at least one score, automatically generating a diagnosis of a disease with respect to the digestive organ of the given patient.

One example embodiment may include the systems above, where the diagnosis is generated in response to an observation of a reaction of the given patient to an irritant or in response to a treatment administered to the given patient with respect to the disease.

One example embodiment may include the systems above, where the disease includes at least one of Crohn's disease, celiac disease, irritable bowel syndrome, ulcerative colitis, or a combination thereof.

One example embodiment may include the systems above, where the set of image frames includes a plurality of homogeneous images.

One example embodiment may include the systems above, where the assigning of at least the first score and the second score is performed following an algorithm that corresponds to at least one of a pattern-recognition algorithm, a classification algorithm, a machine-learning algorithm, or at least one artificial neural network.

One example embodiment may include the systems above, where the at least one artificial neural network includes at least one of a feedforward neural network, a recurrent neural network, a modular neural network, or a memory network.

One example embodiment may include the systems above, where the feedforward neural network corresponds to at least one of a convolutional neural network, a probabilistic neural network, a time-delay neural network, a perceptron neural network, or an autoencoder.

One example embodiment may include a system including a memory; and at least one processor configured to perform operations including receiving a set of image frames, where at least a subset of the set of image frames depicts an inside surface of a digestive organ of a given patient; automatically extracting at least one region of interest in an image frame of the set of image frames, where the at least one region of interest is defined by determining that an edge value exceeds a predetermined threshold; automatically orienting the at least one region of interest, based at least in part on the edge value; automatically inputting the at least one region of interest into an artificial neural network to determine at least one score corresponding to the image frame, the at least one score representing at least one of informativeness of the image frame to show a given feature affecting the digestive organ or severity of the given feature; and automatically assigning the at least one score to the image frame, based on the output of the artificial neural network in response to the inputting the at least one region of interest.

One example embodiment may include the systems above, where the at least one processor is further configured to perform at least one of automatically removing at least some color data from the at least one region of interest; or automatically converting the at least one region of interest to grayscale.

One example embodiment may include the systems above, where the at least one processor is further configured to perform automatically normalizing at least one image attribute of the at least one region of interest.

One example embodiment may include the systems above, where the at least one image attribute includes intensity.

One example embodiment may include the systems above, where no region of interest in the image frame exceeds twenty-five percent of total area of the image frame.

One example embodiment may include the systems above, where each region of interest in the image frame has identical aspect ratio to any other region of interest in the image frame.

One example embodiment may include the systems above, where the at least one artificial neural network includes at least one of a feedforward neural network, a recurrent neural network, a modular neural network, and a memory network.

One example embodiment may include the systems above, where the feedforward neural network corresponds to at least one of a convolutional neural network, a probabilistic neural network, a time-delay neural network, a perceptron neural network, and an autoencoder.

One example embodiment may include the systems above, where the at least one processor is further configured to perform automatically identifying at least one additional region of interest in an additional image frame of the set of image frames, where the additional image frame and the image frame each represent homogeneous images from the set of image frames; automatically inputting the at least one additional region of interest into the artificial neural network; and automatically assigning at least one additional score to the additional image frame of the set of image frames, based on the output of the artificial neural network in response to the inputting the at least one additional region of interest.

One example embodiment may include the systems above, where the at least one score is determined by at least one decision tree.

One example embodiment may include the systems above, where the at least one decision tree is part of at least one of a random decision forest or a regression random forest One example embodiment may include the systems above, where the at least one decision tree includes at least one classifier.

One example embodiment may include the systems above, where the at least one processor is further configured to perform generating at least one regression based at least in part on the at least one decision tree.

One example embodiment may include the systems above, where the at least one regression includes at least one of the following: a linear model, a cutoff, a weighted curve, a Gaussian function, a Gaussian field, or a Bayesian prediction.

One example embodiment may include a system including a memory; and at least one processor configured to perform operations including receiving a first set of image frames and a corresponding first metadata set for input to a first machine-learning (ML) algorithm; inputting the first set of image frames and the corresponding first metadata set to the first ML algorithm; generating a second set of image frames and a corresponding second metadata set as output from the first ML algorithm, where the second set of image frames corresponds to at least one of a tagged version of the first set of image frames and a modified version of the first set of image frames, and where the second metadata set includes at least one score corresponding to at least one image frame of the second set of image frames; and inputting the second set of image frames and the second metadata set into a second ML algorithm to produce at least one of a refined set of image frames, or refined metadata corresponding to the refined set of image frames.

One example embodiment may include the systems above, where the first ML algorithm and the second ML algorithm belong to different categories of ML algorithms.

One example embodiment may include the systems above, where the first ML algorithm and the second ML algorithm are distinct algorithms of a single category of ML algorithms.

One example embodiment may include the systems above, where the first ML algorithm and the second ML algorithm include different iterations or epochs of the same ML algorithm.

One example embodiment may include the systems above, where the first set of image frames includes a plurality of image frames depicting the digestive organ of the given patient and at least one additional image frame depicting a corresponding digestive organ of at least one other patient.

One example embodiment may include the systems above, where the at least one processor is further configured to perform automatically selecting image frames depicting the inside surface of the digestive organ of the given patient, separately from any other image frames; or automatically selecting image frames the subset of the set of image frames that depicts the inside surface of the digestive organ of the given patient, together with the at least one additional image frames corresponding to the digestive organ of the at least one other patient, such that the selected image frames depicting the digestive organ of the given patient are interspersed with the at least one image frame depicting the corresponding digestive organ of the at least one other patient.

One example embodiment may include the systems above, the decomposing further including assigning a second score to the organized presentation of the set of image frames.

One example embodiment may include a system including a memory; and at least one processor configured to perform operations including receiving an output of an imaging device, where the output of the imaging device includes a plurality of image frames forming at least a subset of a set of image frames depicting an inside surface of a digestive organ of a given patient; automatically decomposing, via at least one machine learning (ML) algorithm, at least one image frame of the plurality of image frames into a plurality of regions of interest, where the at least one region of interest is defined by determining that an edge value exceeds a predetermined threshold; automatically assigning a first score based at least in part on the edge value for each region of interest; automatically shuffling the set of image frames; and outputting an organized presentation of the set of image frames after the shuffling.

One example embodiment may include the systems above, the decomposing further including training the at least one ML algorithm, based at least in part on the outputting.

One example embodiment may include the systems above, the decomposing further including assigning a second score to the organized presentation of the set of image frames.

One example embodiment may include a non-transitory computer-readable storage medium having instructions stored thereon that, when executed by at least one computing device, cause the at least one computing device to perform operations including receiving a set of image frames, where at least a subset of the set of image frames depicts an inside surface of a digestive organ of a given patient; and automatically assigning a first score to each image frame of the set of image frames, where the first score corresponds to an informativeness of the image frame with respect to a likelihood of the image frame depicting presence or absence of a given feature on the inside surface of the digestive organ; automatically assigning a second score to each image frame that has the first score within a specified range, where the second score corresponds to a severity of the given feature; and automatically arranging the set of image frames according to at least one of the first score or the second score.

One example embodiment may include the non-transitory computer-readable medium above, where the arranging includes, with respect to at least one of the first score and the second score, at least one of the following: ranking at least some image frames of the set of image frames in descending order of score; ranking at least some image frames of the set of image frames in ascending order of score; assorting at least some image frames of the set of image frames in random order of score; or positioning at least some image frames of the set of image frames in an array based on adjacent image frames in the array having different scores, where the number of adjacent image frames in the array having different score values meets or exceeds a predetermined threshold.

One example embodiment may include the non-transitory computer-readable media above, the operations further including automatically presenting to a reviewer a first image frame of the set of image frames; and automatically presenting to a reviewer a next image frame of the set of image frames, in the order in which the image frames were automatically arranged.

One example embodiment may include the non-transitory computer-readable media above, the operations further including parsing metadata from each image frame of the set of image frames, where the metadata includes at least one of a timestamp, a position, a relative position within the digestive organ, and at least one image property; and based at least in part on the metadata, automatically selecting at least one of the image frames from the set of image frames.

One example embodiment may include the non-transitory computer-readable media above, where the selecting further includes, for a given image frame: automatically determining at least one of the following: whether the first score or the second score fails to meet a predetermined threshold; whether a visual artifact is determined to be present within the image frame; whether timestamp metadata, position metadata, or relative position metadata indicates that the image frame depicts a sample for which image-based indicators are likely to be unreliable; or whether a relative proximity of the given image frame to another image frame falls below a predetermined proximity threshold based on a difference in time, position, or relative position within the digestive organ; and based on the determining, automatically removing the given image frame from the set of image frames.

One example embodiment may include the non-transitory computer-readable media above, where the removing includes relabeling the image frame such that the image frame is not treated as a member of the set of image frames.

One example embodiment may include the non-transitory computer-readable media above, where the given image frame is selected by at least one of sampling randomly, sampling by time, sampling by position, sampling by frequency, sampling by relative position, sampling by relative proximity, and sampling by change in value of the at least one score.

One example embodiment may include the non-transitory computer-readable media above, where the digestive organ includes at least one of an esophagus, a stomach, a small intestine, and a large intestine.

One example embodiment may include the non-transitory computer-readable media above, where the set of image frames originated from at least one imaging device capable of image production and include at least one of the following: photographic image frames, sonographic image frames, radiographic image frames, confocal image frames, or tomographic image frames.

One example embodiment may include the non-transitory computer-readable media above, where the imaging device includes at least one device selected from the group consisting of an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

One example embodiment may include the non-transitory computer-readable media above, the operations further including based on the at least one score, automatically generating a diagnosis of a disease with respect to the digestive organ of the given patient.

One example embodiment may include the non-transitory computer-readable media above, where the diagnosis is generated in response to an observation of a reaction of the given patient to an irritant or in response to a treatment administered to the given patient with respect to the disease.

One example embodiment may include the non-transitory computer-readable media above, where the disease includes at least one of Crohn's disease, celiac disease, irritable bowel syndrome, ulcerative colitis, or a combination thereof.

One example embodiment may include the non-transitory computer-readable media above, where the set of image frames includes a plurality of homogeneous images.

One example embodiment may include the non-transitory computer-readable media above, where the assigning of at least the first score and the second score is performed following an algorithm that corresponds to at least one of a pattern-recognition algorithm, a classification algorithm, a machine-learning algorithm, or at least one artificial neural network.

One example embodiment may include the non-transitory computer-readable media above, where the at least one artificial neural network includes at least one of a feedforward neural network, a recurrent neural network, a modular neural network, or a memory network.

One example embodiment may include the non-transitory computer-readable media above, where the feedforward neural network corresponds to at least one of a convolutional neural network, a probabilistic neural network, a time-delay neural network, a perceptron neural network, or an autoencoder.

One example embodiment may include a non-transitory computer-readable storage medium having instructions stored thereon that, when executed by at least one computing device, cause the at least one computing device to perform operations including receiving a set of image frames, where at least a subset of the set of image frames depicts an inside surface of a digestive organ of a given patient; automatically extracting at least one region of interest in an image frame of the set of image frames, where the at least one region of interest is defined by determining that an edge value exceeds a predetermined threshold; automatically orienting the at least one region of interest, based at least in part on the edge value; automatically inputting the at least one region of interest into an artificial neural network to determine at least one score corresponding to the image frame, the at least one score representing at least one of informativeness of the image frame to show a given feature affecting the digestive organ or severity of the given feature; and automatically assigning the at least one score to the image frame, based on the output of the artificial neural network in response to the inputting the at least one region of interest.

One example embodiment may include the non-transitory computer-readable media above, the operations further including at least one of automatically removing at least some color data from the at least one region of interest; or automatically converting the at least one region of interest to grayscale.

One example embodiment may include the non-transitory computer-readable media above, the operations further including automatically normalizing at least one image attribute of the at least one region of interest.

One example embodiment may include the non-transitory computer-readable media above, where the at least one image attribute includes intensity.

One example embodiment may include the non-transitory computer-readable media above, where no region of interest in the image frame exceeds twenty-five percent of total area of the image frame.

One example embodiment may include the non-transitory computer-readable media above, where each region of interest in the image frame has identical aspect ratio to any other region of interest in the image frame.

One example embodiment may include the non-transitory computer-readable media above, where the at least one artificial neural network includes at least one of a feedforward neural network, a recurrent neural network, a modular neural network, and a memory network.

One example embodiment may include the non-transitory computer-readable media above, where the feedforward neural network corresponds to at least one of a convolutional neural network, a probabilistic neural network, a time-delay neural network, a perceptron neural network, and an auto-encoder.

One example embodiment may include the non-transitory computer-readable media above, the operations further including automatically identifying at least one additional region of interest in an additional image frame of the set of image frames, where the additional image frame and the image frame each represent homogeneous images from the set of image frames; automatically inputting the at least one additional region of interest into the artificial neural network; and automatically assigning at least one additional score to the additional image frame of the set of image frames, based on the output of the artificial neural network in response to the inputting the at least one additional region of interest.

One example embodiment may include the non-transitory computer-readable media above, where the at least one score is determined by at least one decision tree.

One example embodiment may include the non-transitory computer-readable media above, where the at least one decision tree is part of at least one of a random decision forest or a regression random forest One example embodiment may include the non-transitory computer-readable media above, where the at least one decision tree includes at least one classifier.

One example embodiment may include the non-transitory computer-readable media above, the operations further including generating at least one regression based at least in part on the at least one decision tree.

One example embodiment may include the non-transitory computer-readable media above, where the at least one regression includes at least one of the following a linear model, a cutoff, a weighted curve, a Gaussian function, a Gaussian field, or a Bayesian prediction.

One example embodiment may include a non-transitory computer-readable storage medium having instructions stored thereon that, when executed by at least one computing device, cause the at least one computing device to perform operations including receiving a first set of image frames and a corresponding first metadata set for input to a first machine-learning (ML) algorithm; inputting the first set of image frames and the corresponding first metadata set to the first ML algorithm; generating a second set of image frames and a corresponding second metadata set as output from the first ML algorithm, where the second set of image frames corresponds to at least one of a tagged version of the first set of image frames and a modified version of the first set of image frames, and where the second metadata set includes at least one score corresponding to at least one image frame of the second set of image frames; and inputting the second set of image frames and the second metadata set into a second ML algorithm to produce at least one of a refined set of image frames, or refined metadata corresponding to the refined set of image frames.

One example embodiment may include the non-transitory computer-readable media above, where the first ML algorithm and the second ML algorithm belong to different categories of ML algorithms.

One example embodiment may include the non-transitory computer-readable media above, where the first ML algorithm and the second ML algorithm are distinct algorithms of a single category of ML algorithms.

One example embodiment may include the non-transitory computer-readable media above, where the first ML algorithm and the second ML algorithm include different iterations or epochs of the same ML algorithm.

One example embodiment may include the non-transitory computer-readable media above, where the first set of image frames includes a plurality of image frames depicting the digestive organ of the given patient and at least one additional image frame depicting a corresponding digestive organ of at least one other patient.

One example embodiment may include the non-transitory computer-readable media above, the operations further including one of automatically selecting image frames depicting the inside surface of the digestive organ of the given patient, separately from any other image frames; or automatically selecting image frames the subset of the set of image frames that depicts the inside surface of the digestive organ of the given patient, together with the at least one additional image frames corresponding to the digestive organ of the at least one other patient, such that the selected image frames depicting the digestive organ of the given patient are interspersed with the at least one image frame depicting the corresponding digestive organ of the at least one other patient.

One example embodiment may include the non-transitory computer-readable media above, where the second ML algorithm is configured to generate output to be used as input for at least one of the first ML algorithm and a third ML algorithm.

One example embodiment may include a non-transitory computer-readable storage medium having instructions stored thereon that, when executed by at least one computing device, cause the at least one computing device to perform operations including receiving an output of an imaging device, where the output of the imaging device includes a plurality of image frames forming at least a subset of a set of image frames depicting an inside surface of a digestive organ of a given patient; automatically decomposing, via at least one machine learning (ML) algorithm, at least one image frame of the plurality of image frames into a plurality of regions of interest, where the at least one region of interest is defined by determining that an edge value exceeds a predetermined threshold; automatically assigning a first score based at least in part on the edge value for each region of interest; automatically shuffling the set of image frames; and outputting an organized presentation of the set of image frames after the shuffling.

One example embodiment may include the non-transitory computer-readable media above, the decomposing further including training the at least one ML algorithm, based at least in part on the outputting.

One example embodiment may include the non-transitory computer-readable media above, the decomposing further including assigning a second score to the organized presentation of the set of image frames.

One example embodiment may include a method including receiving an image frame output from a camera ingested by a patient, decomposing the image frame into a plurality of regions of interest, assigning, based on the plurality of regions of interest, a value to the image frame; iterating, for a plurality of image frames, the receiving, the decomposing, and the assigning; selecting, from the plurality of image frames, a plurality of selected image frames, where each selected image frame has a respective value above a given threshold; generating a slide deck from the plurality of selected image frames; presenting the slide deck to a reader evaluating the slide deck using a one-dimensional score, where the slide deck is shuffled and presented in an organized fashion calculated to reduce bias of the reader; supervising, based on one or more image frames of the plurality of image frames and at least one of the value or the one-dimensional score, a machine learning (ML) algorithm configured, to perform the decomposing and the assigning, in a fully automated fashion.

One example embodiment may include a system including a memory and at least one processor communicatively coupled to the memory and configured to perform operations including receiving an image frame output from a camera ingested by a patient, decomposing the image frame into a plurality of regions of interest, assigning, based on the plurality of regions of interest, a value to the image frame; iterating, for a plurality of image frames, the receiving, the decomposing, and the assigning; selecting, from the plurality of image frames, a plurality of selected image frames, where each selected image frame has a respective value above a given threshold; generating a slide deck from the plurality of selected image frames; presenting the slide deck to a reader evaluating the slide deck using a one-dimensional score, where the slide deck is shuffled and presented in an organized fashion calculated to reduce bias of the reader; supervising, based on one or more image frames of the plurality of image frames and at least one of the value or the one-dimensional score, a machine learning (ML) algorithm configured, to perform the decomposing and the assigning, in a fully automated fashion.

One example embodiment may include a non-transitory computer readable storage medium including instructions stored thereon that, when executed by at least one processor, cause the at least one processor to perform operations including receiving an image frame output from a camera ingested by a patient, decomposing the image frame into a plurality of regions of interest, assigning, based on the plurality of regions of interest, a value to the image frame; iterating, for a plurality of image frames, the receiving, the decomposing, and the assigning; selecting, from the plurality of image frames, a plurality of selected image frames, where each selected image frame has a respective value above a given threshold; generating a slide deck from the plurality of selected image frames; presenting the slide deck to a reader evaluating the slide deck using a one-dimensional score, where the slide deck is shuffled and presented in an organized fashion calculated to reduce bias of the reader; supervising, based on one or more image frames of the plurality of image frames and at least one of the value or the one-dimensional score, a machine learning (ML) algorithm configured, to perform the decomposing and the assigning, in a fully automated fashion.

One example embodiment may include a computer-implemented method including receiving, via at least one processor, a set of image frames, where at least a subset of the set of image frames depicts an inside surface of a digestive organ of a given patient; and automatically assigning, via the at least one processor, a first score to each image frame of the set of image frames, where the first score corresponds to an informativeness of the image frame with respect to a likelihood of the image frame depicting presence or absence of a given feature on the inside surface of the digestive organ, and where the given feature is used to asses a disease state of a small-bowel enteropathy.

One example embodiment may include the methods above, further including assigning, via the at least one processor, a second score to the image frame, where the second score corresponds to a severity of the given feature.

One example embodiment may include the methods above, further including monitoring, via the at least one processor, disease worsening or disease improvement, using the second score.

One example embodiment may include the methods above, further including automatically arranging, via the at least one processor, the set of image frames according to at least one of the first score or the second score to quantify a disease effect over a portion of the digestive organ.

One example embodiment may include a system including a memory and at least one processor communicatively coupled to the memory and configured to perform operations including receiving, via at least one processor, a set of image frames, where at least a subset of the set of image frames depicts an inside surface of a digestive organ of a given patient; and automatically assigning, via the at least one processor, a first score to each image frame of the set of image frames, where the first score corresponds to an informativeness of the image frame with respect to a likelihood of the image frame depicting presence or absence of a given feature on the inside surface of the digestive organ, and where the given feature is used to asses a disease state of a small-bowel enteropathy.

One example embodiment may include the systems above, the operations further including assigning, via the at least one processor, a second score to the image frame, where the second score corresponds to a severity of the given feature.

One example embodiment may include the systems above, the operations further including monitoring, via the at least one processor, disease worsening or disease improvement, using the second score.

One example embodiment may include the systems above, the operations further including automatically arranging, via the at least one processor, the set of image frames according to at least one of the first score or the second score to quantify a disease effect over a portion of the digestive organ.

One example embodiment may include a non-transitory computer-readable storage medium including instructions stored thereon that, when executed by at least one processor, cause the at least one processor to perform operations including receiving, via at least one processor, a set of image frames, where at least a subset of the set of image frames depicts an inside surface of a digestive organ of a given patient; and automatically assigning, via the at least one processor, a first score to each image frame of the set of image frames, where the first score corresponds to an informativeness of the image frame with respect to a likelihood of the image frame depicting presence or absence of a given feature on the inside surface of the digestive organ, and where the given feature is used to asses a disease state of a small-bowel enteropathy.

One example embodiment may include the non-transitory computer-readable storage media above, the operations further including assigning, via the at least one processor, a second score to the image frame, where the second score corresponds to a severity of the given feature.

One example embodiment may include the non-transitory computer-readable storage media above, the operations further including monitoring, via the at least one processor, disease worsening or disease improvement, using the second score.

One example embodiment may include the non-transitory computer-readable storage media above, the operations further including automatically arranging, via the at least one processor, the set of image frames according to at least one of the first score or the second score to quantify a disease effect over a portion of the digestive organ.

It is to be appreciated that the Detailed Description section below, not the Summary or Abstract sections, is intended to be used to interpret the claims. The Summary and Abstract sections may set forth one or more, but not all, exemplary embodiments of the enhanced battery management techniques described herein for battery longevity extension, and therefore are not intended to limit the appended claims in any way.

Other systems, methods, features, and advantages of the enhanced techniques disclosed herein will be, or will become, apparent to one with skill in the art upon examination of the following detailed description and corresponding drawings filed herewith. It is intended that all such additional systems, methods, features, and advantages be included within this description, and be protected by the claims that follow.

DETAILED DESCRIPTION

Provided herein are system, apparatus, device, method and/or computer program product embodiments, and/or combinations and sub-combinations thereof, for image scoring for intestinal pathology (enteropathy). By scoring images according to enhanced techniques disclosed herein, it is possible to mitigate or resolve the difficulties described in the Background section above. These enhanced techniques of image scoring not only improve reliability of diagnosing and monitoring by human reviewers (e.g., gastroenterologists, other medical professionals), but also serve as a basis for automated techniques of review, monitoring, diagnosis, or any combination of these.

For some non-limiting examples referenced in this detailed description, certain types of enteropathy, work of medical professionals (e.g., gastroenterologists), and diagnosis or monitoring, may be included as non-limiting use cases for purposes of illustrating some of the enhanced techniques described herein. The enhanced techniques described in this specification may hereby serve to establish new standards of care in medical fields including gastroenterology. Where present-day physicians' diagnostics and monitoring may be analogous to environmental scientists walking into a forest to measure effects of widespread phytopathology in individual trees, the enhanced techniques described herein may be regarded as analogous to using aerial imaging to create a map of the entire forest, enabling a comprehensive numerical metric to evaluate the overall extent of the pathology in the forest as a whole.

However, in addition to medical diagnostics, observation, and monitoring, these enhanced techniques of image scoring may also have broader applications than the non-limiting examples described in this specification. Elements of these enhanced techniques also improve on aspects of other fields such as computer vision and artificial intelligence, including machine learning, to name a few examples.

General Approach of Scoring and Sampling

In some embodiments, a score may be calculated for an image frame on a per-frame basis. Such a score may, for example, indicate how informative the image frame as a whole may be with respect to features it may clearly show with respect to determining other characteristics, such as intensity of a feature of a given disease in a given organ shown in the image frame. For example, by applying image filters, at least one computer processor (such as processor 904) may be configured to perform automatic segmentation of an image frame to determine regions of the image frame that may contribute to or detract from the ability of a reviewer (human or artificial intelligence) to evaluate the image frame to score other aspects of the image frame, such as severity of potential disease or features thereof.

A one-dimensional numeric scale may be used to determine informativeness of a given image frame. In a particular use case, when analyzing image frames depicting an inside wall of a small intestine to determine severity of celiac disease features, different information may be determinable depending on whether an image frame shows a mucosal face of the intestinal wall, or whether an image frame shows a mucosal edge (crest of a fold of a mucosal face), for example. Generally, villi may be more visible in images of edges than of faces, so images showing primarily edges may be more informative than images showing primarily faces. Visibility of villi may facilitate determinations of villous atrophy, which may be used to observe severity of celiac disease, for example.

Image frames showing image regions of both the mucosal faces and the mucosal edges may be even more informative than those image frames that only show one or the other. At the other extreme, image frames that show neither face nor edge characteristics (e.g., due to lack of light, lack of focus, obstructing artifacts in images, etc.) may not be useful for determining significant disease feature, at least by computer vision for automated severity scoring.

In order to compare image frames against a threshold and/or make any other determination about which images to use for later scoring, such as of disease severity, numerical scores may be analyzed and adjusted. For example, out of a set of image frames, any image frame having an informativeness score over a certain threshold may be passed to another scoring module for scoring severity of disease features. In order to carry out such numerical computations and comparisons, points on a one-dimensional numeric scale may be assigned for certain characteristics and combinations thereof.

Actual values on the scale may be discrete, in some embodiments, or instead continuous, in other embodiments, with assigned characteristic values being only guidance. In an embodiment, an informativeness score may be defined on a four-point scale: for an image frame with no clear information (with respect to a given disease), an informativeness score may be at or near zero; for an image frame primarily showing mucosal face images, the informativeness score may be at or near one; for an image frame primarily showing mucosal edge images, the informativeness score may be at or near two; and for an image frame significantly showing both mucosal face and mucosal edge images, the informativeness score may be at or near three; this scale of zero to three is a non-limiting example solely for illustrative purposes.

Based on such informativeness scores of individual image frames, additional calculations may be performed for automatically determining likely informativeness of another image frame. For example, thresholds of informativeness may be determined manually or automatically. In some embodiments, regression rules may be used with informativeness scores to predict informativeness of image frames in frame sets and account for most variance between image frames. In some embodiments, random forest (RF) algorithms may be applied, as well as machine learning (ML) models, which may be trained using manually scored learning sets. Other scores of the same image frames may be used to train the ML models handling informativeness. For example, image frames may be independently scored first for severity, which may in turn influence a later informativeness scoring and informativeness threshold, in some embodiments.

Attribution of any score to an image frame (or sufficiently large region thereof) may be performed by any algorithms including artificial intelligence (AI) models, computer vision (CV), machine learning (ML), random forest (RF) algorithms, etc. More specifically, and as further described below, artificial neural network (ANN) technologies may also be leveraged in processes of classification and scoring, whether for informativeness, severity, or other measures. ANN examples may include feedforward neural networks, further including convolutional neural networks (CNN)—other configurations are possible, as explained in more detail below.

An informativeness score may, in some embodiments, be referred to as a quality score, usefulness score, reliability score, reproducibility score, etc., or any combination thereof. When filtering a set of image frames based on informativeness, for example, image frames below a certain informativeness threshold may be handled in various ways, including deletion or removal from the set, hiding or ignoring these image frames for purposes of assigning other scores, and/or setting aside the image frames below the certain informativeness threshold for subsequent analysis, which may be similar to or different from the initial scoring for informativeness or other scoring for other values.

In addition to scoring, including informativeness scoring and sorting images above or below a given threshold, sampling may also be performed to select certain image frames from a set of image frames. For some parts of a given organ known to be generally more informative than other parts, more images may be probabilistically selected from those more informative parts than from less informative parts. For example, certain diseases of the small intestine may be expressed more or less reliably in a given part of the small intestine proportionately (e.g., sampling more from the distal tertile, sampling less from the proximal vigintile, etc.). When looking for features of celiac disease, to name one specific example, such features may generally be more apparent in the proximal tertile of the small intestine than in the distal tertile. Thus, sampling algorithms for observing celiac disease may give more weight to the proximal tertile rather than the distal tertile, while also disregarding samples from the proximal vigintile. Specific locations depend on organ and disease features being targeted, as different diseases even in the same organ may be expressed differently and/or in different relative positions of the same organ.

Actual informativeness scores may also feed into sampling adaptively, such that regions having corresponding image frames with higher informativeness scores may, in turn, be sampled more frequently than other regions having corresponding image frames with lower scores. Other sampling methods may be used, for example, methods based on square roots or cube roots. For informativeness, adaptive sampling and selection may be adjusted depending on whether the subsequent scoring for another attribute (e.g., disease severity) is to be performed automatically (e.g., by AI) or manually by a human reviewer, to reduce fatigue and bias.

Scores may also be aggregated, such as for a set of image frames and/or for a specific patient, including in examples where a set of image frames may have multiple patients. Severity scores may be weighted by corresponding informativeness scores to obtain an aggregate score for an image frame set and/or for a patient, in some example embodiments.

Additionally, for determining informativeness and/or other score metrics, image frame scores may be fitted to a curve, such as to determine expected values, abnormalities, outlier values, etc. Scores may be weighted, and predetermined values of relative position may be assigned weighted averages of specific scores, such as to determine informativeness or other score metrics of parts of a given organ according to relative position, in some embodiments.

Weights may be normalized, for example, to have an average value of one (or any other default normal value). Weights may be determined using a probability density function (PDF), e.g., normal, uniform, logarithmic, etc., which may also be modified based on known distributions of probabilities correlated with relative position along a given organ—for example, in the case of proximal regions of the small intestine (pyloric region transitioning to duodenum), certain scores may be expected to differ from corresponding scores of medial or distal regions (jejunum, ileum, and ileal transition to cecum). These variations may be accounted for in order to determine local abnormalities or to ignore expected variations that may differ from norms in other regions but which may not otherwise be of interest.

In accordance with a general approach, including any combination of the techniques described herein, images may be segmented, scored, and/or arranged in ways conducive to accurate identification, review, classification, and/or diagnosis. Selected examples of certain techniques described herein are not intended to be limiting, but rather provide illustrative guidelines for those of ordinary skill in the art to implement technologies according to these enhanced techniques.

Scoring Informativeness of an Image Frame or Region Thereof

FIG. 1 is a flowchart illustrating a method 100 for identifying and/or selecting at least one snippet in an image frame according to the enhanced image processing techniques described herein, according to some embodiments. Method 100 may be performed by processing logic that may comprise hardware (e.g., circuitry, dedicated logic, programmable logic, microcode, etc.), software (e.g., instructions executing on a processing device), or a combination thereof. Not all steps of method 100 may be needed in all cases to perform the enhanced techniques disclosed herein. Further, some steps of method 100 may be performed simultaneously, or in a different order from that shown in FIG. 1, as will be understood by a person of ordinary skill in the art.

Method 100 shall be described with reference to FIGS. 7-9. However, method 100 is not limited only to those example embodiments. The steps of method 100 may be performed by at least one computer processor coupled to at least one memory device. An exemplary processor and memory device(s) are described below with respect to 904 of FIG. 9. In some embodiments, method 100 may be performed using system 300 of FIG. 3, which may further include at least one processor and memory such as those of FIG. 9.

Figure 7:
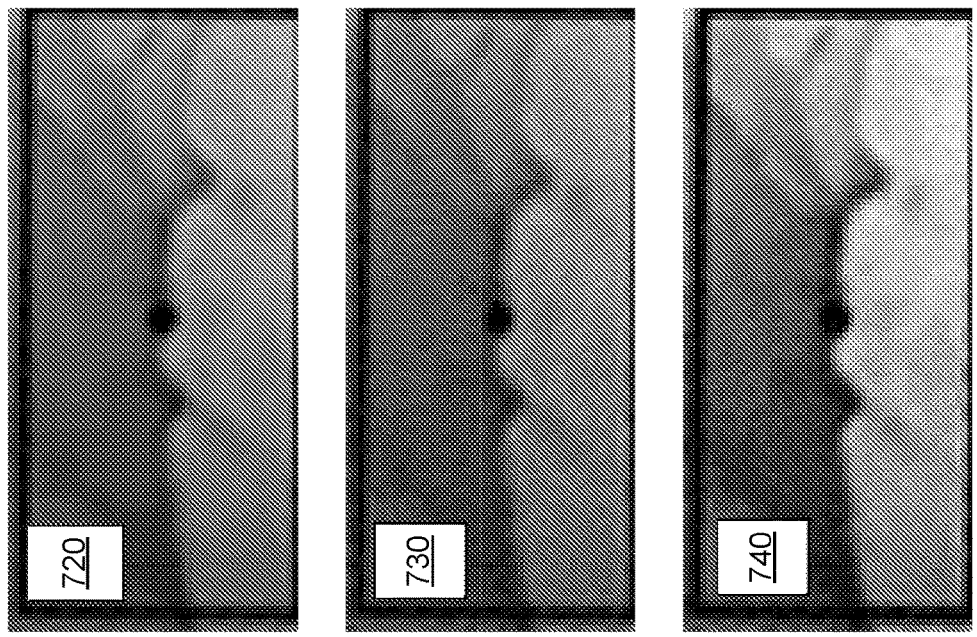
FIG. 7 is an illustration of a single snippet in an image frame, according to some embodiments.
Figure 7:
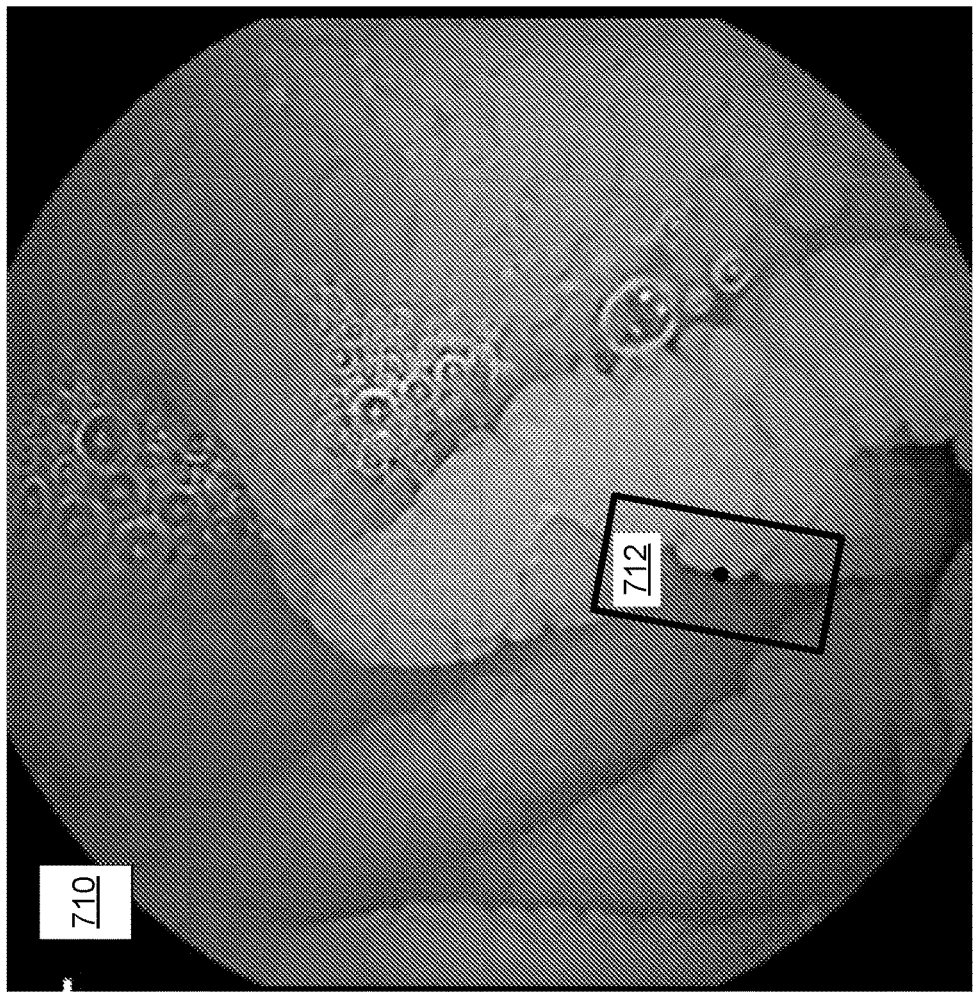
Figure 8:
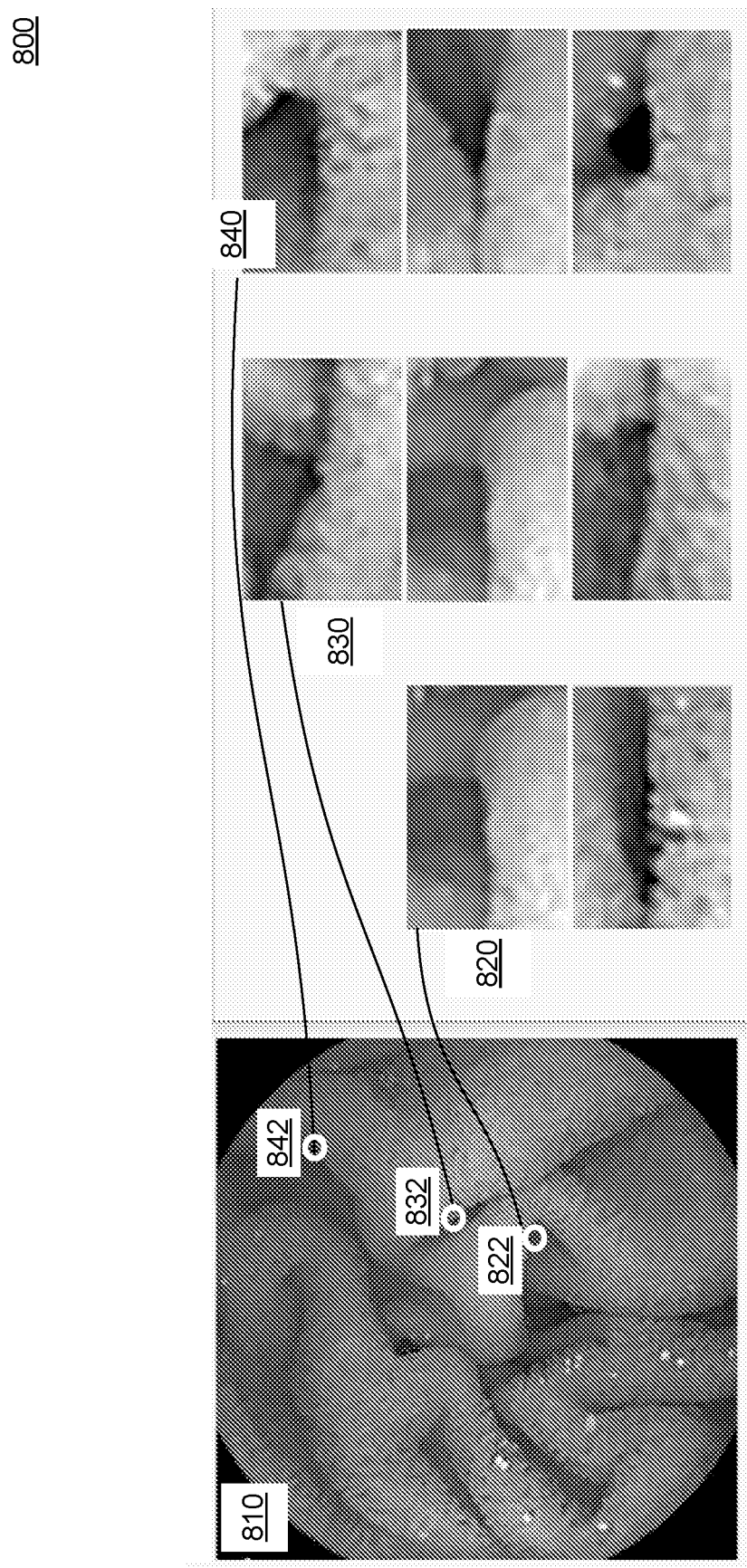
FIG. 8 is an illustration of multiple snippets in an image frame, according to some embodiments.

In 102, at least one processor 904 may be configured to receive a set of image frames, such as the image frames shown at the left-hand side of FIGS. 7 and 8, for example. The image frames may originate from at least one sensor, camera, or other imaging device, as described herein. Some non-limiting examples include an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

Any given image frame in the set of image frames may be generated in response to automated or event-driven input, manual input from a user, or any sequence or set of imaging procedures as prescribed by a given imaging device, for example. Image frame generation may be based on sampling, including but not limited to sampling randomly, sampling by time, sampling by position, sampling by frequency, sampling by relative position, sampling by relative proximity, and sampling by change in value of the at least one score, for example. Sampling by relative proximity, for example, may allow biologically-based samples, focusing on parts of an organ most likely to yield informative expressions of certain disease features.

Image frames may be defined, for purposes of this example, as images representing (showing, depicting) a part of an organ that may show features potentially indicating a particular disease, for example. In some cases, the features may be indicative of symptoms or other expressions of the particular disease. In some embodiments, an image frame may comprise images from multiple cameras or sensors taken at substantially the same time, e.g., from a bug-eye camera device; an image frame need not be limited to a single output of one sensor or camera.

Each image frame may be received from an imaging device directly as the images are taken, from another device, internal or external to the imaging device, such as a storage device capable of storing image data after images are taken, for example, or any combination of the above. Thus, image frames may be received from practically any other source of image data as would be understood by a person of ordinary skill in the art. Some non-limiting examples of storage devices may include local storage media, and network storage media (including on a local network or on remote resources over a network or cloud-computing infrastructure) accessible via a standard protocol, user interface (UI), application programming interface (API), etc.

In 104, processor 904 may assign the at least one score to the image frame based at least in part on the output of an artificial neural network (ANN), or by other means of determining the first score. In some embodiments, the first score may be an informativeness score (quality score, reliability score, etc.). By assigning such image frame scores to image frames in a set of image frames, it is possible in turn to sort, rank (ascending or descending), or otherwise arrange the image frames of the set of image frames, as further described below with respect to 108. In some embodiments, the first score may be used for normalization as further described below with respect to 106. Alternatively, in other embodiments, the first score for each frame as assigned in 104 may instead be used as a basis for filtering using a threshold, as further described below with respect to 108, but bypassing the normalization.

Figure 10:
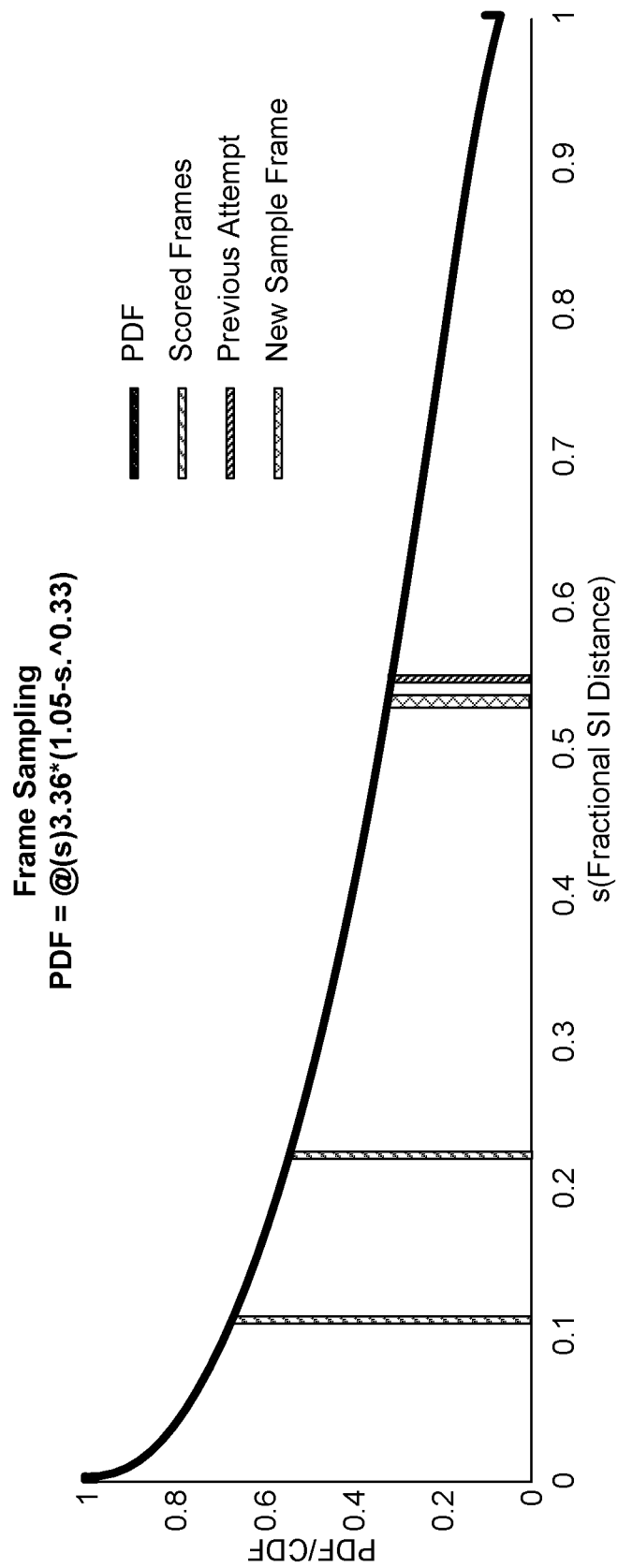
FIG. 10 is an example of reassigning scores of already scored image frames, with respect to a function correlated with relative position, according to some embodiments.

In 106, processor 904 may normalize the first score of each image frame in the set of image frames, by at least one curve fit as described above. has the first score within a specified range. The at least one curve fit (or fitting to at least one curve) may be based on inputs including at least one PDF and/or other local weighting, such as for expected values correlated with relative position or other parameters, for example. The normalized scores may be weighted with respect to a predetermined default value, in some embodiments. In some embodiments, scores may be normalized iteratively for adaptive sampling, repeating 104 to reassign scores and to select new corresponding image samples if reassigned scores change, for example. FIG. 10 shows an example of adaptive sampling with respect to a PDF correlated with relative position.

In 108, processor 904 may be configured to extract at least one region of interest from the given image frame based on the normalized first score(s) of 106. For purposes of method 100, a snippet may include at least one region of interest of the image frame (e.g., as shown in FIGS. 7 and 8). Specifically, a snippet may, in some embodiments, be defined as a region of interest that may have a particular area, shape, and/or size, encompassing a given edge value (e.g., exceeding a predetermined edge detection threshold) within an image frame identified as including a mucosal face and/or an edge of a mucosal face, for example. Such snippets may be identified using at least some filters (e.g., edge filters, horizon filters, color filters, etc.). These filters may include some of the edge detection algorithms and/or predetermined thresholds, such as for scores as assigned in 104 and normalized in 106 above, for example, or using any other score metric. For desired results, a given neural network, may be designed, customized, and/or modified in various ways, in some embodiments, as further described below.

A snippet may be defined as having a small area relative to the overall image frame size, e.g., 0.7% of total image frame area per snippet, in some embodiments. Other embodiments may define a snippet as up to 5% or 25% of the image frame area, depending on other factors such as actual area of target organ depicted in each image frame, for example. Where image frames may be defined to be relatively smaller (e.g., smaller components of larger images taken at a given time), snippets may, in some embodiments, be defined as potentially occupying relatively more of an image frame's area.

In an embodiment where the first score is for informativeness (or reliability) of the image frames, then 108 may be selectively applied, in some cases, only to image frames having at least a minimum first score of informativeness or reliability, disregarding image frames having lower scores below a given threshold, as such image frames may not be sufficiently informative or reliable to yield meaningful second scores. For selectively applying 108, e.g., to a selected frame or frames forming a subset of the set frames received in 102, scored in 104, and normalized in 106, some embodiments may also perform specific steps as described further below with respect to method 1100 of FIG. 11. Additionally, or alternatively, a range may be specified as having upper and/or lower boundaries, rather than threshold values only. Thus, image frames having first score values between arbitrary values x and y may be excluded from assignment of a second score, but image frames having first score values below x or above y may be processed for snippet extraction in 108, for example. Alternatively, the specified range may be discontinuous. Thus, in other embodiments, image frames having first score values below x or above y may be excluded from snippet extraction, but image frames between x and y may be processed for snippet extraction in 108, for example.

Additionally in 108, any extracted snippet(s) may be oriented (or reoriented) in a particular direction. This orientation may be performed in the same operation as the extraction, for example, or may, in other embodiments, be performed as a separate step. In some embodiments, the particular direction may be relative to an edge within the region of interest. In some cases in an intestine, for example, this orientation may be determined by ensuring that a mucosal edge is at the bottom of the oriented region of interest, or in any other preferred orientation with respect to a particular edge, face, or other image feature.

One example embodiment may operate by measuring, at points within the region of interest, a magnitude of a vector to the centroid of horizons in a circular region around each point measured. If a vector is determined to exceed a particular threshold (e.g., 25% of the radius of the circular region), this may determine a bottom of a region of interest, and a rectangular patch may be drawn (e.g., parallel to the vector, having length x percent of the image frame's width, and having height y percent of the image frame's height). These (re)oriented snippets may each be evaluated separately from the image frame, so as to provide a score for the entire image frame, for example, with respect to informativeness and/or severity of disease features, as further described below in 110. Absent a strong vector (e.g., 25% of the radius of the circular region), orientation may be skipped, in some embodiments.

In 110, the at least one region of interest may be input into an artificial neural network (ANN) to determine at least one score of the image frame. The ANN may be at least one of a feedforward neural network, a recurrent neural network, a modular neural network, or a memory network, to name a few non-limiting examples. In the case of a feedforward neural network, for example, this may further correspond to at least one of a convolutional neural network, a probabilistic neural network, a time-delay neural network, a perceptron neural network, an autoencoder, or any combination thereof, in some embodiments.

To show one non-limiting example, the ANN may be a pseudo-regression convolutional neural network (CNN). The CNN may have convolutional layers deep and multiple initial features, including several more features per convolutional layer, for example.

Further, for a given neural network and set of image frames, regions of interest, and/or snippets, in some embodiments, the number of connecting neurons in each layer of a (deep) neural network may be adjusted to accommodate small image size, for example. In deep neural networks, output of convolutional layers may feed transition layers for further processing. Output of these layers may be merged, with multiple replicates, into a densely connected multi-layer perceptron (see FIG. 1 as described above). In an embodiment, with five replicates (e.g., to survive dropout), multiple layers may be merged down to three layers with final outputs of ten classes, where each class represents a tenth of the range of 0-3, for example. During training, position may be obscured by adding normally distributed noise having a standard deviation of 0.2 (to prevent overfitting), according to a further example of a pseudo-regression CNN.

According to a further example, scores may be refined and generalized to an image frame as a whole based on one or more snippets or regions of interest within the image frame. One way of achieving this result is using a pseudo-regression CNN, for which a relatively small percentage of image frames in training sets are withheld from the CNN. For example, in a case where 10% of image frames are withheld, and snippets each yield 10 values after CNN processing, half of the withheld (reserved) snippets may be used to train a random forest (RF) of 100 trees, to estimate local curve value, in an embodiment. This estimate, along with the 10-valued outputs from the other half of the reserved training snippets, may be used to build another random forest that may estimate error, for example.

In 112, processor 904 may assign the at least one score to the image frame based at least in part on the output of the ANN in response to the input of 110, according to some embodiments. Per at least the examples described with respect to 110 above, it is possible to determine a score for an entire image frame based on one or more snippets or regions of interest within the image frame. By assigning such image frame scores to image frames in a set of image frames, it is possible in turn to sort, rank (ascending or descending), or otherwise arrange the image frames of the set of image frames.

In 114, based at least on the first score, the second score, or both scores, assigned to each image frame across a set of image frames (or for a particular patient, for example), processor 904 may determine at least one aggregate score for the set (or patient), according to some embodiments. Aggregate scores may further be used for diagnosis or observation of a given disease of interest, for example, or may be used for further summarizing or categorizing results of image scoring and/or sampling according to at least the techniques described above and further below. The aggregate score may, for example, indicate overall villous atrophy in a potential celiac patient, so as to facilitate diagnosis, in an example embodiment. Aggregate scores may also be generated for regions of a particular organ (e.g., medial tertile of small intestine, distal quartile of ileum, etc.), in some embodiments.

Additionally, AI may perform more consistent and reliable automated diagnosis of diseases of interest, in some embodiments, based at least on the at least one aggregate score. In an example of intra-intestinal imaging, an application of the enhanced techniques described herein may allow for considerably improved reliability in diagnosis of celiac disease, to name one non-limiting example. Moreover, diagnosis may be made manually or automatically in response to an observation of a reaction of a given patient to an irritant, or in response to a treatment administered to the given patient with respect to a disease.

Such diagnoses may be facilitated by the enhanced techniques described herein, even when the set of image frames includes largely homogeneous images-aside from certain landmark features of the intestinal tract (e.g., pylorus, duodenum, cecum, etc.), much of the small intestine may look the same as the rest of the small intestine at any given part. This homogeneity may confuse or bias human reviewers, leading them to assume that there is no change even when there may be a subtle yet measurable difference. Such homogeneity may also cause differences to be lost in many conventional edge detection algorithms, depending on thresholds, smoothing, gradients, etc. However, using the enhanced techniques described herein, detection of even subtle features of certain diseases may be significantly improved, resulting in more accurate diagnosis of those diseases.

Scoring Severity of Disease Features in an Image Frame

Figure 2:
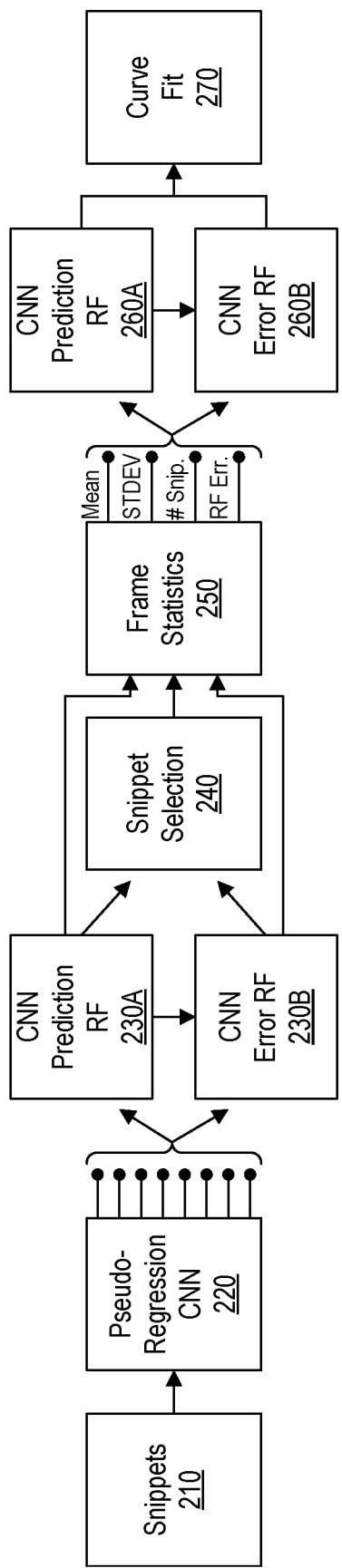
FIG. 2 is a flowchart illustrating a method for capturing expected changes in disease features of a given organ in response to therapy, challenge, or another stimulus, according to some embodiments.

FIG. 2 is a flowchart illustrating a method 200 for capturing expected changes in disease features of a given organ in response to therapy, challenge, or another stimulus, according to some embodiments. A method such as method 200 may be used for clinical trials of certain medical treatments, to name one non-limiting use case. Method 200 may be performed by processing logic that may comprise hardware (e.g., circuitry, dedicated logic, programmable logic, microcode, etc.), software (e.g., instructions executing on a processing device), or a combination thereof. Not all steps of method 200 may be needed in all cases to perform the enhanced image processing techniques disclosed herein. Further, some steps of method 200 may be performed simultaneously, or in a different order from that shown in FIG. 2, as will be understood by a person of ordinary skill in the art.

Method 200 shall be described with reference to FIGS. 4-8. However, method 200 is not limited only to those example embodiments. The steps of method 200 may be performed by at least one computer processor coupled to at least one memory device. An exemplary processor and memory device(s) are described below with respect to FIG. 9. In some embodiments, method 200 may be performed by system 300 of FIG. 3, which may further include at least one processor and memory such as those of FIG. 9.

The method may be initialized, executed, or otherwise started if not already being performed. From the initialization stage, following any implementation-specific initialization procedures, if any, according to some embodiments, the method may then advance to 210. In some embodiments, this flow of execution may be defined by a finite state machine, procedural programming, object-oriented programming, and/or other logic in hardware, software, or some combination of the above.

Figure 5:
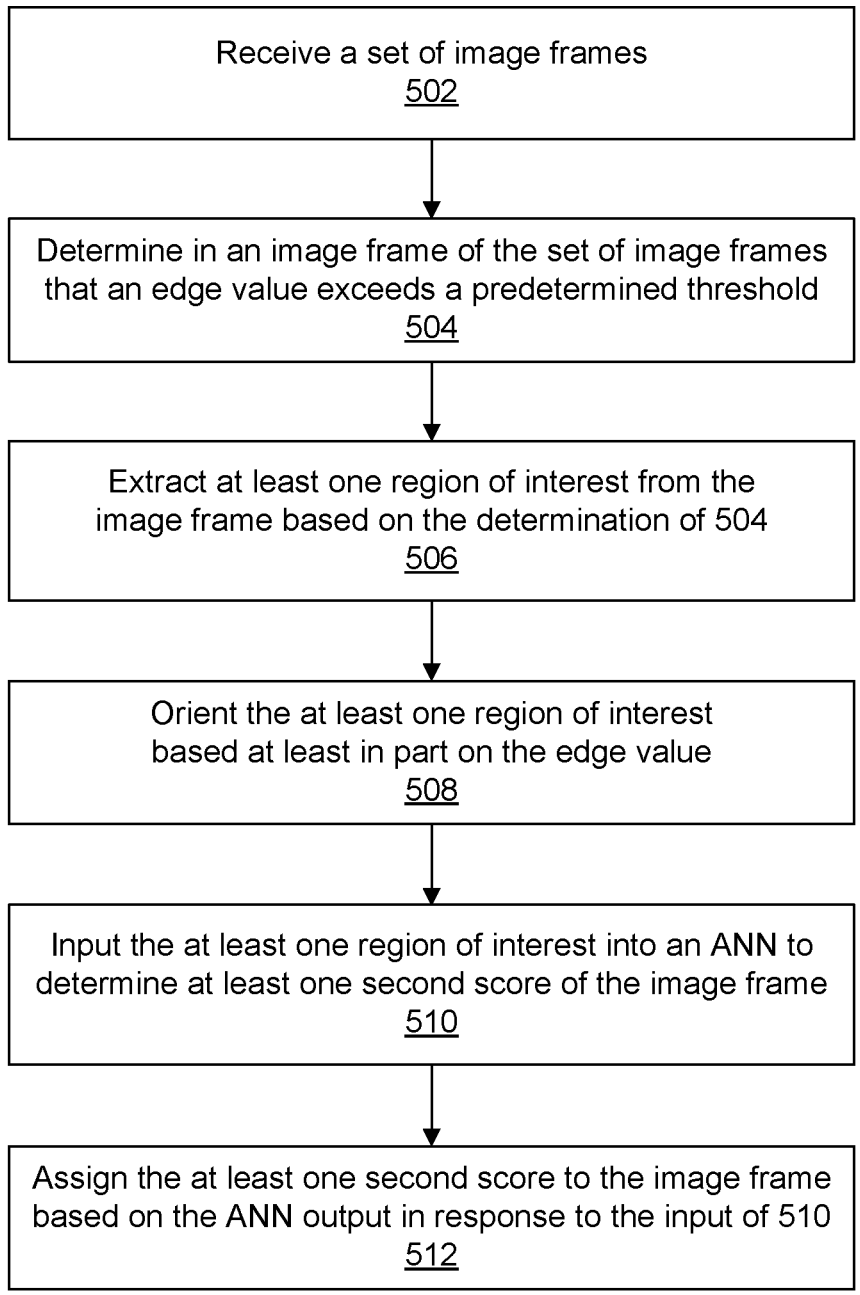
FIG. 5 is a flowchart illustrating a method for identifying or selecting at least one snippet in an image frame described herein, according to some embodiments.

In 210, regions of interest (in some embodiments represented as "snippets"), may be extracted from one or more image frames (see method 500 in FIG. 5 for further description of regions of interest or snippets). Also in 210, these regions of interest or snippets may be processed in other ways, such as orienting and/or reorienting the regions of interest or snippets, as well as applying other filters for color, brightness, and normalization, to name a few non-limiting examples. From this stage at 210, extracted regions of interest (for purposes of method 200, a region of interest is interchangeably referred to as a snippet) may then be input to a pseudo-regression convolutional neural network (CNN) for processing in 220.

In 220, the regions of interest or snippets may be processed by at least one neural network, such as a pseudo-regression CNN, in this example. Although the non-limiting example embodiment depicted in FIG. 2 shows CNNs, other types of neural networks and/or algorithms may perform the processing of 220 in other embodiments. More detail on how this pseudo-regression CNN processing works is described below with respect to FIG. 5. Output from the pseudo-regression CNN in 220 may be relayed to a CNN prediction random forest (RF) in 230A and/or a CNN error RF in 230B.

In 230A, the CNN prediction RF may receive at least one result from the pseudo-regression CNN in 220. Following its own processing, the CNN prediction RF may output at least one result as input to snippet selection in 240 and/or as input to frame statistics in 250, for example. The resulting value of the CNN prediction RF output may correspond to, in some embodiments, localized severity of a feature of disease in a given snippet, for example. Such prediction may also be referred to as estimation or evaluation. More detail on prediction using RFs (e.g., for edge detection) is described below with respect to FIG. 5. The CNN prediction RF output may also serve as input to the CNN error RF in 230B, described below.

In 230B, the CNN error RF may receive at least one result from the pseudo-regression CNN in 220. Following its own processing, the CNN prediction RF may output at least one result as input to snippet selection in 240 and/or as input to frame statistics in 250, for example. More detail on prediction using RFs (e.g., for error estimation) is described below with respect to FIG. 5.

In 240, snippet selection may be performed. In some embodiments, snippet selection may be performed by edge detection and re-orienting extracted images around detected edges (e.g., as a result of RF prediction by a CNN in 230A). Snippets may be evaluated (scored) and potentially ranked, such as by image properties including intensity, and/or based on content, such as severity of a feature of potential disease. More detail on snippet selection and scoring is discussed below with respect to FIGS. 4 and 5. Selected snippets may be used as input to compute frame statistics in 250, for example. Additionally or alternatively, some embodiments may integrate snippet selection with steps of image conversion, masking, edge detection, reorientation, or a combination thereof, to name a few non-limiting examples. An embodiment incorporating such steps is described further below with respect to method 1200 of FIG. 12.

In 250, frame statistics may be calculated, in some embodiments. Frame statistics include, but are not limited to, mean or standard deviation of certain metrics of snippets, frames, or frame sets, numbers of snippets per frame or frame set, frame metadata per frame or frame set, error values estimated in 230B by the CNN error RF, etc. Frame statistics may be useful in determining overall ("big picture") scores for a given patient at a given time, for example, in diagnosis of a particular disease. In another example, frames that have higher-than-expected standard deviations for their regions of interest may be determined to be less informative than other frames, in some cases.

In 260A, the CNN prediction RF may receive at least one result from the pseudo-regression CNN in 250. Following its own processing, the CNN prediction RF may output at least one result as input to curve fit 270, for example. The resulting value of the CNN prediction RF output may correspond to, in some embodiments, localized severity of a feature of disease in a given snippet, for example. Such prediction may also be referred to as estimation or evaluation. More detail on prediction using RFs (e.g., for edge detection) is described below with respect to FIG. 5. The CNN prediction RF output may also serve as input to the CNN error RF in 260B, described below.

In 260B, the CNN error RF may receive at least one result from the pseudo-regression CNN in 250. Following its own processing, the CNN prediction RF may output at least one result as input to curve fit 270, for example. More detail on prediction using RFs (e.g., for error estimation) is described below with respect to FIG. 5.

In 270, curve fitting may be performed, for further filtering and/or normalizing results gathered from CNN/RF prediction and/or error estimation calculations. Normalization may be with respect to a curve (e.g., Gaussian distribution, Lorentzian distribution, etc.). In some embodiments, image intensity with respect to a snippet may refer to a disease severity prediction for each snippet. In some embodiments, image intensity may refer to a disease severity score for an entire image frame. In some embodiments, image intensity may refer to a specific image property, such as brightness or color saturation, for example. More detail on normalization, such as for curve fitting, is discussed below with respect to FIG. 7.

FIG. 2 includes a caption briefly describing the operation of method 200 using example values of pseudo-regression CNN being configured to produce 10 outputs, and RFs used on validation snippets with error below 0.5. However, other embodiments may be implemented using different values for number of outputs and error tolerance, for example. Appendix A, attached hereto, provides additional detail regarding embodiments of method 200.

Figure 9:
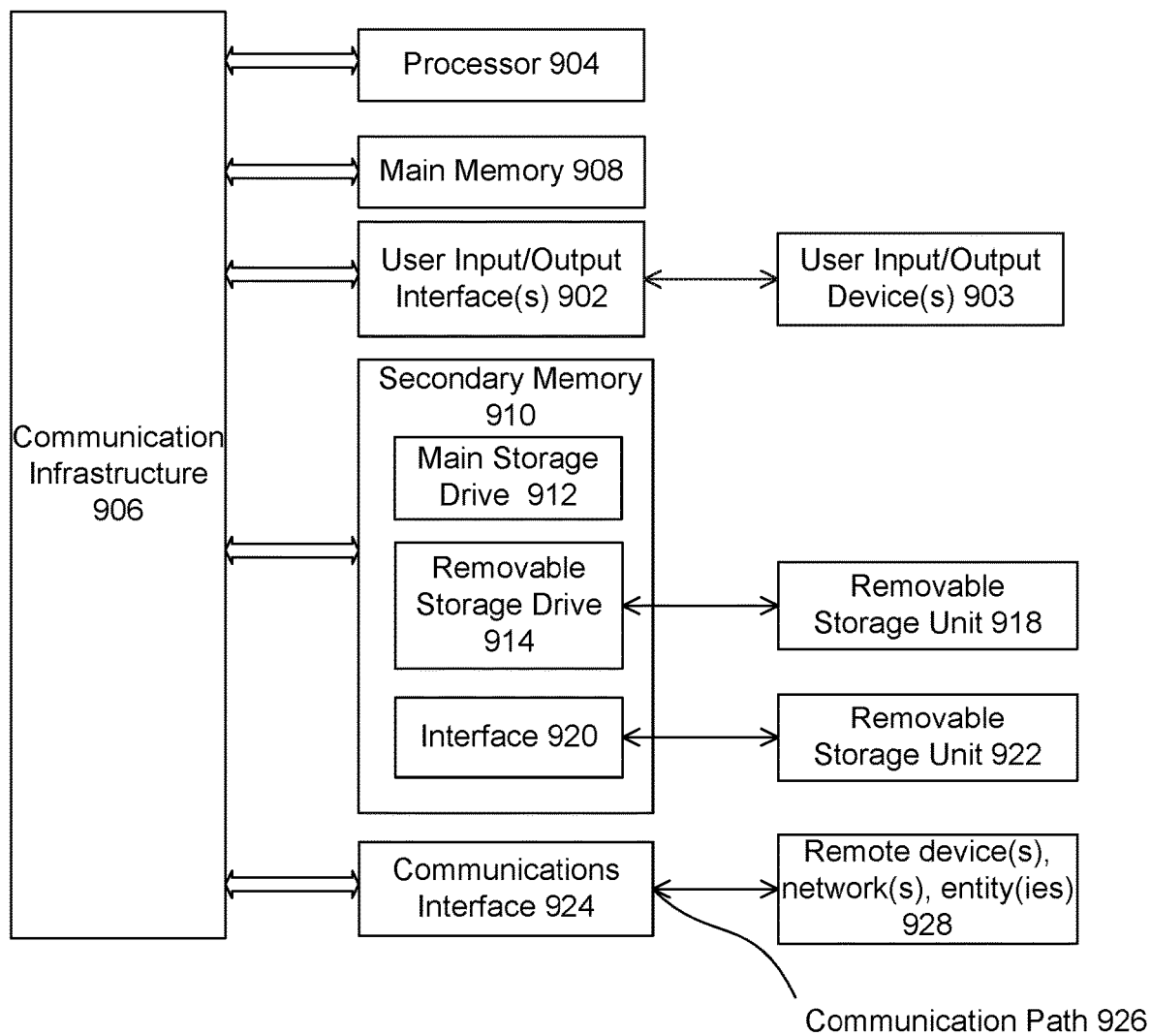
FIG. 9 is an example computer system useful for implementing various embodiments.

Various embodiments may be implemented, for example, using one or more known computer systems, such as computer system 900 shown in FIG. 9. Computer system 900 may comprise system 300 of FIG. 3, and may be used, for example, to implement method 200 of FIG. 2.

Method 200 is disclosed in the order shown above in this exemplary embodiment of FIG. 2. In practice, however, the operations disclosed above, alongside other operations, may be executed sequentially in any order, or they may alternatively be executed concurrently, with more than one operation being performed simultaneously, or any combination of the above.

Implementing the above operations of FIG. 2 may offer at least the following advantages: using these enhanced techniques, such as the image processing outlined in FIG. 2, reliability of scoring and other assessments of disease features, symptoms, and diagnosis may be improved, further enabling reliable clinical trials and/or treatment of diseases that have typically been difficult to diagnose and treat. Method 200 of FIG. 2, as well as methods 400, 500, and 600 of FIGS. 4-6 described below, provide efficient and reliable ways of achieving certain results useful for observation, diagnosis, and treatment of patients.

Example CNN Application for Scoring Informativeness or Severity

Figure 3:
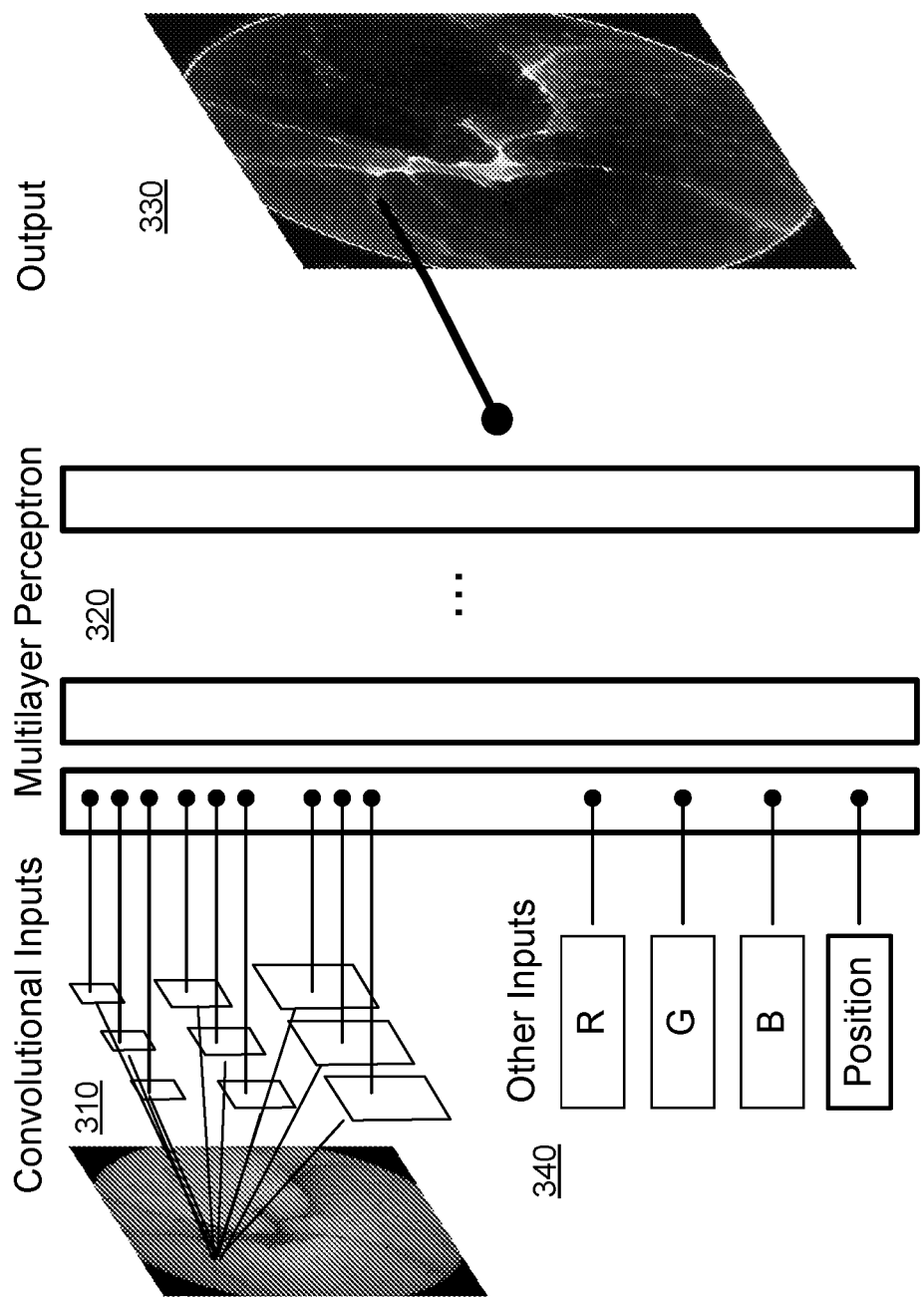
FIG. 3 is a block diagram illustrating a system implementing enhanced image processing techniques, according to some embodiments.

FIG. 3 is a block diagram illustrating a system implementing some of the enhanced image processing techniques described herein, according to some embodiments.

System 300 may include a multi-layer perceptron 320 configured to receive at least one convolutional input 310 and any number of other inputs 340, for example, to produce at least a voxel output 330, in an embodiment. Multi-layer perceptron 320 may be or include a feedforward neural network and/or a classifier, for example, and that has a plurality of layers. In some embodiments, the layers may be densely connected, such as in cases where activation functions may be reused from certain layers or where activation of one or more layers is skipped to resolve certain calculations, e.g., weight matrices, in some embodiments.

Multi-layer perceptron 320 or another neural network (e.g., at least one convolutional neural network (CNN) associated with the at least one convolutional input 310) may map a given voxel output to a measure of severity of a disease feature corresponding to the voxel, in some embodiments. Such severity measures may be used to attribute a score to an image frame corresponding to at least one given voxel, for example. In some embodiments, voxels may additionally or alternatively be represented as regions of interest and/or snippets, for example.

Some of the other inputs may include, for example, color values (e.g., in RGB color space or PBG color space, to name a few non-limiting examples), and/or image metadata, including timestamp metadata, position metadata, or relative position metadata, for example. In an embodiment, where relative position may indicate a measure or percentage (from start to end) along the length of the small intestine, for example, such metadata may play a role in how informativeness and/or disease severity may be measured or scored by a neural network including multi-layer perceptron 320, and may affect voxel output 330.

Each of these elements may be modular components implemented in hardware, software, or some combination thereof. Further, in some embodiments, any of these elements may be integrated with computer system 900 or multiple instances thereof. Additionally, system 300 may be useful for implementing any of methods 200, 400, 500, 600, or similar methods to those illustrated in FIGS. 2 and 4-6, for example.

The convolutional input 310 data may originate from practically any source, including user input, machine input, or other automated inputs, including periodic or event-driven inputs. The image frames may originate from at least one sensor, camera, or other imaging device, as described herein. Some non-limiting examples include an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

Image frames may be sourced from an imaging device directly as the images are taken, from another device such as a storage device capable of storing image data after images are taken, for example, or any combination of the above. Thus, image frames may be received from practically any other source of image data as would be understood by a person of ordinary skill in the art. Some non-limiting examples of storage devices include local storage media, and network storage media (including on a local network or on remote resources over a network or cloud-computing infrastructure) accessible via a standard protocol, user interface (UI), application programming interface (API), etc.

Additional logic of multi-layer perceptron 320 and/or other neural networks may be implemented to perform further processing. Some examples of such further processing are illustrated in FIGS. 2 and 4-6 herein.

Scoring and Arranging Image Frames

Figure 4:
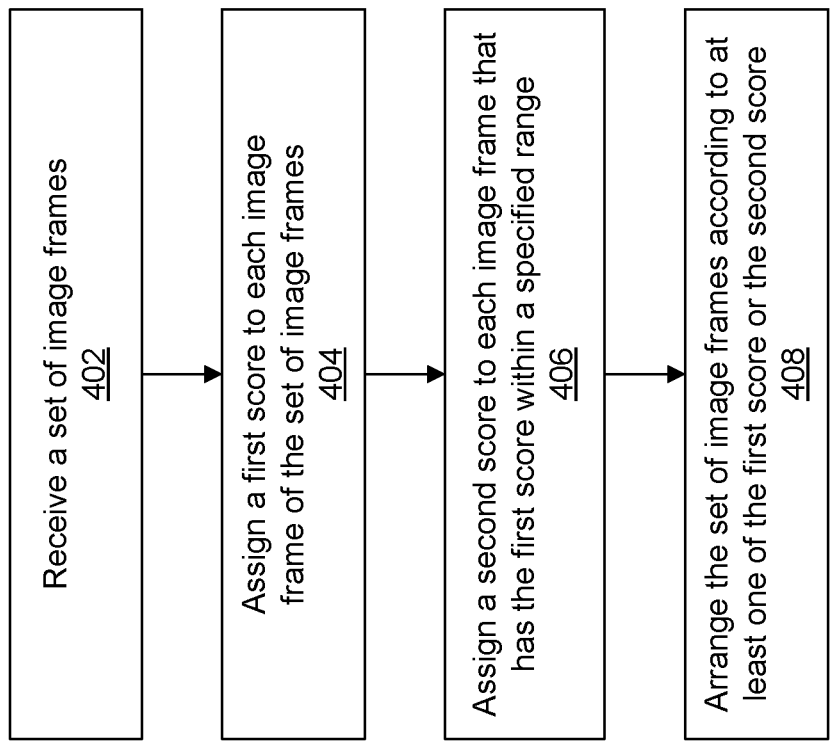
FIG. 4 is a flowchart illustrating a method for identifying and/or selecting at least one snippet in an image frame described herein, according to some embodiments.

FIG. 4 is a flowchart illustrating a method 400 for scoring and arranging image frames according to the enhanced image processing techniques described herein, according to some embodiments. Method 400 may be performed by processing logic that may comprise hardware (e.g., circuitry, dedicated logic, programmable logic, microcode, etc.), software (e.g., instructions executing on a processing device), or a combination thereof. Not all steps of method 400 may be needed in all cases to perform the enhanced techniques disclosed herein. Further, some steps of method 400 may be performed simultaneously, or in a different order from that shown in FIG. 4, as will be understood by a person of ordinary skill in the art.

In 402, at least one processor 904 may be configured to receive a set of image frames, such as the image frames shown at the left-hand side of FIGS. 7 and 8, for example. The image frames may originate from at least one sensor, camera, or other imaging device, as described herein. Some non-limiting examples include an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

Any given image frame in the set of image frames may be generated in response to automated or event-driven input, manual input from a user, or any sequence or set of imaging procedures as prescribed by a given imaging device, for example. Image frame generation may be based on sampling, including but not limited to sampling randomly, sampling by time, sampling by position, sampling by frequency, sampling by relative position, sampling by relative proximity, and sampling by change in value of the at least one score, for example. Sampling by relative proximity, for example, may allow biologically-based samples, focusing on parts of an organ most likely to yield informative expressions of certain disease features.

Image frames may be defined, for purposes of this example, as images representing (showing, depicting) a part of an organ that may show features potentially indicating a particular disease, for example. In some cases, the features may be indicative of symptoms or other expressions of the particular disease. In some embodiments, an image frame may comprise images from multiple cameras or sensors taken at substantially the same time, e.g., from a bug-eye camera device; an image frame need not be limited to a single output of one sensor or camera.

Each image frame may be received from an imaging device directly as the images are taken, from another device, internal or external to the imaging device, such as a storage device capable of storing image data after images are taken, for example, or any combination of the above. Thus, image frames may be received from practically any other source of image data as would be understood by a person of ordinary skill in the art. Some non-limiting examples of storage devices may include local storage media, and network storage media (including on a local network or on remote resources over a network or cloud-computing infrastructure) accessible via a standard protocol, user interface (UI), application programming interface (API), etc.

In 404, processor 904 may assign the at least one score to the image frame based at least in part on the output of the ANN in response to the input of 510, according to some embodiments. Per at least the examples described with respect to 510 above, it is possible to determine a score for an entire image frame based on one or more snippets or regions of interest within the image frame. By assigning such image frame scores to image frames in a set of image frames, it is possible in turn to sort, rank (ascending or descending), or otherwise arrange the image frames of the set of image frames, as further described below with respect to 408.

In 406, processor 904 may assign a second score to each image frame that has the first score within a specified range. For example, in an embodiment where the first score is for informativeness (or reliability) of the image frames, then 406 may be selectively applied, in some cases, only to image frames having at least a minimum first score of informativeness or reliability, disregarding image frames having lower scores below a given threshold, as such image frames may not be sufficiently informative or reliable to yield meaningful second scores.

In this example, the second score may refer to intensity or severity of a disease feature in a part of a target organ shown in the image frame. However, in some embodiments, the second score may, additionally or alternatively, refer to any quantifiable metric or qualitative property, including any image properties or image frame metadata, for example. Additionally, the specified range may have upper and/or lower boundaries, rather than threshold values only. Thus, image frames having first score values between arbitrary values x and y may be excluded from assignment of a second score, but image frames having first score values below x or above y may be assigned a second score in 406, for example. Alternatively, the specified range may be discontinuous. Thus, in other embodiments, image frames having first score values below x or above y may be excluded from assignment of a second score, but image frames between x and y may be assigned a second score in 406, for example.

In 408, processor 904 may arrange the set of image frames according to at least one of the first score or the second score, according to some embodiments. By arranging (sets of) image frames in this way, rather than simply in an order of distance along a length, it further becomes possible, for example, to curate sets of image frames to present to human reviewers for diagnosis, in manners designed to reduce reviewer bias, in some embodiments. Human reviewers may yield more accurate and consistent results if bias can be reduced by techniques such as randomizing and assorting images in random order of time, location, and/or projected (estimated) score as determined by the ANN, for example, after having eliminated unreliable (non-informative) image frames from the set and automatically presenting the assorted images to a human reviewer. Sorting order may also be determined by image frame metadata, such as of timestamps, positions, relative positions within a given organ, and at least one image property, which may be parsed by processor 904. Processor 904 may additionally or alternatively remove an image frame from the set based on its corresponding metadata, for example.

Additionally, it becomes possible for artificial intelligence (AI) to perform more consistent and reliable automated diagnosis of diseases of interest, in some embodiments. In an example of intra-intestinal imaging, an application of the enhanced techniques described herein may allow for considerably improved reliability in diagnosis of celiac disease, to name one non-limiting example. Moreover, diagnosis may be made manually or automatically in response to an observation of a reaction of a given patient to an irritant, or in response to a treatment administered to the given patient with respect to a disease.

Such diagnoses may be facilitated by the enhanced techniques described herein, even when the set of image frames includes largely homogeneous images-aside from certain landmark features of the intestinal tract (e.g., pylorus, duodenum, cecum, etc.), much of the small intestine may look the same as the rest of the small intestine at any given part. This homogeneity may confuse or bias human reviewers, leading them to assume that there is no change even when there may be a subtle yet measurable difference. Such homogeneity may also cause differences to be lost in many conventional edge detection algorithms, depending on thresholds, smoothing, gradients, etc. However, using the enhanced techniques described herein, detection of even subtle features of certain diseases may be significantly improved, resulting in more accurate diagnosis of those diseases.

Selecting a Snippet (Region of Interest) in an Image Frame

FIG. 5 is a flowchart illustrating a method 500 for identifying and/or selecting at least one snippet in an image frame according to the enhanced image processing techniques described herein, according to some embodiments. Method 500 may be performed by processing logic that may comprise hardware (e.g., circuitry, dedicated logic, programmable logic, microcode, etc.), software (e.g., instructions executing on a processing device), or a combination thereof. Not all steps of method 500 may be needed in all cases to perform the enhanced techniques disclosed herein. Further, some steps of method 500 may be performed simultaneously, or in a different order from that shown in FIG. 5, as will be understood by a person of ordinary skill in the art.

Method 500 shall be described with reference to FIGS. 2, 3, and 6-8. However, method 500 is not limited only to those example embodiments. The steps of method 500 may be performed by at least one computer processor coupled to at least one memory device. An exemplary processor and memory device(s) are described below with respect to 904 of FIG. 9. In some embodiments, method 500 may be performed using system 300 of FIG. 3, which may further include at least one processor and memory such as those of FIG. 9.

In 502, at least one processor 904 may be configured to receive a set of image frames, such as the image frames shown at the left-hand side of FIGS. 7 and 8, for example. The image frames may originate from at least one sensor, camera, or other imaging device, as described herein. Some non-limiting examples include an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

Any given image frame in the set of image frames may be generated in response to automated or event-driven input, manual input from a user, or any sequence or set of imaging procedures as prescribed by a given imaging device, for example. Image frame generation may be based on sampling, including but not limited to sampling randomly, sampling by time, sampling by position, sampling by frequency, sampling by relative position, sampling by relative proximity, and sampling by change in value of the at least one score, for example. Sampling by relative proximity, for example, may allow biologically-based samples, focusing on parts of an organ most likely to yield informative expressions of certain disease features.

Image frames may be defined, for purposes of this example, as images representing (showing, depicting) a part of an organ that may show features potentially indicating a particular disease, for example. In some cases, the features may be indicative of symptoms or other expressions of the particular disease. In some embodiments, an image frame may comprise images from multiple cameras or sensors taken at substantially the same time, e.g., from a bug-eye camera device; an image frame need not be limited to a single output of one sensor or camera.

Each image frame may be received from an imaging device directly as the images are taken, from another device such as a storage device capable of storing image data after images are taken, for example, or any combination of the above. Thus, image frames may be received from practically any other source of image data as would be understood by a person of ordinary skill in the art. Some non-limiting examples of storage devices may include local storage media, network storage media (including on a local network or on remote resources over a network or cloud-computing infrastructure) accessible via a standard protocol, user interface (UI), application programming interface (API), etc.

In 504, processor 904 may be configured to determine in an image frame of the set of image frames that an edge value exceeds a predetermined threshold. This determination may, in some embodiments, be used ultimately to determine informativeness of an image frame (how likely the image frame may be to show presence, absence, or severity of a disease feature) and/or to determine severity (sometimes referred to as disease intensity) of a given feature, assuming that the image frame analyzed in making this determination is sufficiently informative. In some embodiments, this determination may be attempted in any given image frame to identify one or more edges in an image frame that may form the basis of one or more snippets of the image frame (see FIGS. 7 and 8), or that the image frame has no edges useful for making a determination of a feature of a given disease, for example.

To determine that an edge value exceeds a predetermined threshold, any of a variety of edge detection techniques may be used, including calculation of local maxima or zero-crossings of differential operators or Laplacian functions, for example, or other differential edge detection methods, to name a few non-limiting examples. Any threshold for edge-detection purposes described here may be determined by various techniques to balance signal and noise in a given set of images, including adaptive thresholding techniques and/or using threshold hysteresis, for example. Additional steps may also accompany edge detection, such as Gaussian smoothing, transforming specific color ranges, separating color channels, computing gradients and/or gradient estimates, etc.

Further aiding edge detection may be use of at least one machine learning (ML) algorithm, neural network (NN), and/or random forest (RF), in some embodiments. For example, a ML algorithm may be trained, with images from inside an intestinal tract, to separate a mucosal foreground from a background or to separate obstructions (suspended materials, bile flows, etc.) or other artifacts (air bubbles, bright spots, reflections, etc.) in an intestinal image frame, for example. While such anomalies may reduce effectiveness of relatively simple edge detection algorithms, neural networks, machine learning, random forests, or any combination thereof may be configured to detect such images or regions as spurious (non-informative or unreliable) and remove them from consideration in a set of image frames, in some embodiments.

For example, bright spots may be detected by at least two of three channels of an RGB (red-green-blue color model) image each having a relatively high intensity. Beyond bright spots, bright lines may be indicative of air bubbles. Bile may be determined by casting RGB color space to PBG (pink-brown-green) and detecting a high-intensity green channel, in some embodiments. These are just a few examples of how some artifacts may be determined in analyzing intestinal images. Image frames having such artifacts may be classified as less informative or non-informative.

A mucosal face may be determined as having at least one strong edge (detected with a high-threshold edge filter). With respect to determining celiac disease and severity thereof, for example, image frames comprising mucosal faces may be determined as being informative or relatively more informative than other image frames. Among informative image frames, without obstructive artifacts, severity of a disease feature may in turn be more reliably scored, such as based on features of edges and faces corresponding to intra-intestinal surfaces. Such scoring may be done manually, by a human specialist (e.g., gastroenterologist) reviewing image frames in a set of image frames, for example. In some embodiments, such scoring may be performed automatically, applying the similar or different algorithms with respect to edge and/or face features, for example.

In 506, processor 904 may be configured to extract at least one region of interest from the given image frame based on the determination of 504. For purposes of method 500, a region of interest may include at least one snippet of the image frame (e.g., as shown in FIGS. 7 and 8). Specifically, a snippet may, in some embodiments, be defined as a region of interest that may have a particular area, shape, and/or size, encompassing a given edge value (e.g., exceeding a predetermined edge detection threshold) within an image frame identified as including a mucosal face and/or an edge of a mucosal face, for example. A snippet may be defined as having a small area relative to the overall image frame size, e.g., 0.7% of total image frame area per snippet, in some embodiments. Other embodiments may define a snippet as up to 5% or 25% of the image frame area, depending on other factors such as actual area of target organ depicted in each image frame, for example. Where image frames may be defined to be relatively smaller (e.g., smaller components of larger images taken at a given time), snippets may, in some embodiments, be defined as potentially occupying relatively more of an image frame's area.

In 508, the at least one region of interest, such as any extracted from the given image frame based on the determination of 504, may be oriented (or reoriented) in a particular direction. In some embodiments, the particular direction may be relative to an edge within the region of interest. In some cases in an intestine, for example, this orientation may be determined by ensuring that a mucosal edge is at the bottom of the oriented region of interest.

One example embodiment may operate by measuring, at points within the region of interest, a magnitude of a vector to the centroid of horizons in a circular region around each point measured. If a vector is determined to exceed a particular threshold (e.g., 25% of the radius of the circular region), this may determine a bottom of a region of interest, and a rectangular patch may be drawn (e.g., parallel to the vector, having length x percent of the image frame's width, and having height y percent of the image frame's height). These (re)oriented snippets may each be evaluated separately from the image frame, so as to provide a score for the entire image frame, for example, with respect to informativeness and/or severity of disease features, as further described below in 510. Absent a strong vector (e.g., 25% of the radius of the circular region), orientation may be skipped, in some embodiments.

In 510, the at least one region of interest may be input into an artificial neural network (ANN) to determine at least one score of the image frame. The ANN may be at least one of a feedforward neural network, a recurrent neural network, a modular neural network, or a memory network, to name a few non-limiting examples. In the case of a feedforward neural network, for example, this may further correspond to at least one of a convolutional neural network, a probabilistic neural network, a time-delay neural network, a perceptron neural network, an autoencoder, or any combination thereof, in some embodiments.

In further embodiments based on convolutional neural network (CNN) processing, for example, such CNNs may further integrate at least some filters (e.g., edge filters, horizon filters, color filters, etc.). These filters may include some of the edge detection algorithms and/or predetermined thresholds as described with respect to 504 above, for example. For desired results, a given ANN, including a CNN, may be designed, customized, and/or modified in various ways, for example, according to several criteria, in some embodiments. Filters may be of different sizes, in some embodiments. Convolutional filters, e.g., implemented by CNNs, may be trained using random selections of training data or noise generated therefrom. CNN-based filters may be configured to output additional information regarding confidence of regressions, e.g., for predictions of identified features in regions of interest, in some embodiments. Generally, CNN-based filters may improve confidence of results, while increasing complexity of design and implementation of the filters.

To show one non-limiting example, the CNN may be a pseudo-regression CNN based on a DenseNet architecture (dense convolutional neural network architecture or residual neural network with multiple-layer skips). More specifically, in further embodiments according to this example, the CNN may be based on DenseNet121 and configured to have one dense block that is four convolutional layers deep (block configuration=(4,0)), with 16 initial features, and with 16 more features per convolutional layer, for example.

Further, for a given neural network and set of image frames, regions of interest, and/or snippets, in some embodiments, the number of connecting neurons in each layer of a (deep) neural network may be adjusted to accommodate small image size, for example. In deep neural networks, output of convolutional layers may feed transition layers for further processing. Output of these layers may be merged, with multiple replicates, into a densely connected multi-layer perceptron (see FIG. 1 as described above). In an embodiment, with five replicates (e.g., to survive dropout), multiple layers may be merged down to three layers with final outputs of ten classes, where each class represents a tenth of the range of 0-3, for example. During training, position may be obscured by adding normally distributed noise having a standard deviation of 0.2 (to prevent overfitting), according to a further example of a pseudo-regression CNN.

According to a further example, scores may be refined and generalized to an image frame as a whole based on one or more snippets or regions of interest within the image frame. One way of achieving this result is using a pseudo-regression CNN, for which a relatively small percentage of image frames in training sets are withheld from the CNN. For example, in a case where 10% of image frames are withheld, and snippets each yield 10 values after CNN processing, half of the withheld (reserved) snippets may be used to train a random forest (RF) of 100 trees, to estimate local curve value, in an embodiment. This estimate, along with the 10-valued outputs from the other half of the reserved training snippets, may be used to build another random forest that may estimate error, for example.

In 512, processor 904 may assign the at least one score to the image frame based at least in part on the output of the ANN in response to the input of 510, according to some embodiments. Per at least the examples described with respect to 510 above, it is possible to determine a score for an entire image frame based on one or more snippets or regions of interest within the image frame. By assigning such image frame scores to image frames in a set of image frames, it is possible in turn to sort, rank (ascending or descending), or otherwise arrange the image frames of the set of image frames.

By arranging (sets of) image frames in this way, it further becomes possible, for example, to curate sets of image frames to present to human reviewers for diagnosis, in manners designed to reduce reviewer bias, in some embodiments. Human reviewers may yield more accurate and consistent results if bias can be reduced by techniques such as randomizing and assorting images in random order of time, location, and/or projected (estimated) score as determined by the ANN, for example, after having eliminated unreliable (non-informative) image frames from the set and automatically presenting the assorted images to a human reviewer. Sorting order may also be determined by image frame metadata, such as of timestamps, positions, relative positions within a given organ, and at least one image property, which may be parsed by processor 904. Processor 904 may additionally or alternatively remove an image frame from the set based on its corresponding metadata, for example.

Additionally, it becomes possible for artificial intelligence (AI) to perform more consistent and reliable automated diagnosis of diseases of interest, in some embodiments. In an example of intra-intestinal imaging, an application of the enhanced techniques described herein may thus allow for considerably improved reliability in diagnosis of celiac disease, to name one non-limiting example. Moreover, diagnosis may be made manually or automatically in response to an observation of a reaction of a given patient to an irritant, or in response to a treatment administered to the given patient with respect to a disease.

Such diagnoses may be facilitated by the enhanced techniques described herein, even when the set of image frames includes largely homogeneous images. Aside from certain landmark features of the intestinal tract (e.g., pylorus, duodenum, cecum, etc.), much of the small intestine may look the same as the rest of the small intestine at any given part. This homogeneity may confuse or bias human reviewers, leading them to assume that there is no change even when there may be a subtle yet measurable difference. Such homogeneity may also cause differences to be lost in many conventional edge detection algorithms, depending on thresholds, smoothing, gradients, etc. However, using the enhanced techniques described herein, detection of even subtle features of certain diseases may be significantly improved, resulting in more accurate diagnosis of those diseases.

Training Machine-Learning Algorithms

Figure 6:
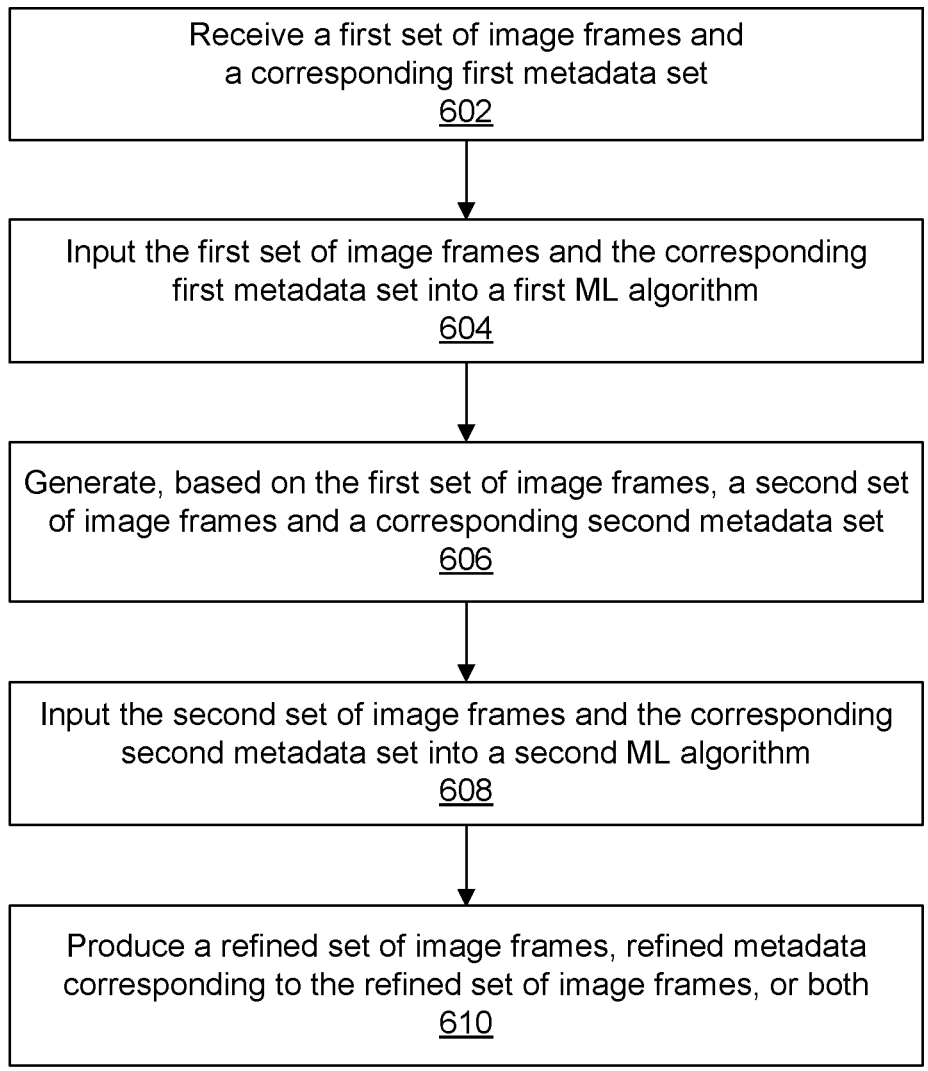
FIG. 6 is a flowchart illustrating a method for training of a machine learning algorithm using another machine learning (ML) algorithm, according to some embodiments.

FIG. 6 is a flowchart illustrating a method 600 for training of a machine learning (ML) algorithm, using another ML algorithm, according to some embodiments. Method 600 may be performed by processing logic that may comprise hardware (e.g., circuitry, dedicated logic, programmable logic, microcode, etc.), software (e.g., instructions executing on a processing device), or a combination thereof. Not all steps of method 600 may be needed in all cases to perform the enhanced techniques disclosed herein. Further, some steps of method 600 may be performed simultaneously, or in a different order from that shown in FIG. 6, as will be understood by a person of ordinary skill in the art.

Method 600 shall be described with reference to FIGS. 2, 3, and 7-9. However, method 600 is not limited only to those example embodiments. The steps of method 600 may be performed by at least one computer processor coupled to at least one memory device. An exemplary processor and memory device(s) are described below with respect to 904 of FIG. 9. In some embodiments, method 600 may be performed using system 300 of FIG. 3, which may further include at least one processor and memory such as those of FIG. 9.

In 602, at least one processor 904 may be configured to receive a first set of image frames, such as the image frame shown at the left-hand side of FIGS. 7 and 8, for example, and a corresponding first metadata set. The image frames may originate from at least one sensor, camera, or other imaging device, as described herein. Some non-limiting examples include an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

Any given image frame in the set of image frames may be generated in response to automated or event-driven input, manual input from a user, or any sequence or set of imaging procedures as prescribed by a given imaging device, for example. Image frame generation may be based on sampling, including but not limited to sampling randomly, sampling by time, sampling by position, sampling by frequency, sampling by relative position, sampling by relative proximity, and sampling by change in value of the at least one score, for example. Sampling by relative proximity, for example, may allow biologically-based samples, focusing on parts of an organ most likely to yield informative expressions of certain disease features. Additional information about imaging is described with respect to FIG. 5 above.

The first metadata set may include, for example and without limitation, timestamps, positions, relative positions within a given organ, and at least one image property, which may be parsed by processor 904. Processor 904 may additionally or alternatively add or remove an image frame to or from the set based on the image's corresponding metadata, for example.

In 604, processor 904 may input the first set of image frames and the corresponding first metadata set into a first ML algorithm. The first ML algorithm may include any suitable algorithms, including those geared toward regressions, deep learning, reinforcement learning, active learning, supervised learning, semi-supervised learning, unsupervised learning, and other equivalent aspects within the scope of ML. The ML algorithm may, in some embodiments, rely on artificial neural networks including deep convolutional neural networks, for example.

In 606, processor 904 may generate, based on the first set of image frames, a second set of image frames and a corresponding metadata set. This second set of image frames and/or corresponding metadata set may be based on at least one output value from the first ML algorithm, in some embodiments. Such output may serve as a basis to evaluate the performance and accuracy of the first ML algorithm, for example. In some embodiments, such output may also serve as input to one or more other ML algorithm(s), such as for training the other ML algorithm(s), as shown in 608 below. In this example, the one or more other ML algorithm(s) may be of the same type as the first ML algorithm, a different type from that of the first ML algorithm, or a combination thereof.

In 608, at least some of the output generated in 606 may be input, such as by processor 904, in the form of a second set of image frames and their corresponding second metadata set being fed into a second ML algorithm. Depending on output of the first ML algorithm (e.g., at 606), the second set of image frames may be a subset of the first set of image frames and/or may be refined in other ways. By way of further example, the corresponding second metadata may, in some embodiments, include more detail than the first metadata set, depending on output of the first ML algorithm.

Depending on what the first ML algorithm and the second ML algorithm are and how they may operate, such a configuration may allow ML algorithms to train other ML algorithms cooperatively, improving performance and efficacy of one or more ML algorithms with at least the given processing task(s) at hand. This improvement may further be refined by 610 below.

In 610, processor 904 may produce a refined set of image frames, refined metadata corresponding to the refined set of image frames, or a combination of the above. The refined set of image frames may, in some embodiments, be distinct from either of the first set of image frames or the second set of image frames. The refined metadata may similarly be a subset or a superset of the first and/or second metadata sets, or, in some embodiments, may have no overlap with either of the first or second metadata sets. In some embodiments, the refined image frames and/or refined metadata may be suitable for presentation as a diagnosis, as informative images for review, or as some combination of these, to name a few examples, Method 600 is disclosed in the order shown above in this exemplary embodiment of FIG. 6. In practice, however, the operations disclosed above, alongside other operations, may be executed sequentially in any order, or they may alternatively be executed concurrently, with more than one operation being performed simultaneously, or any combination of the above.

Implementing the above operations of FIGS. 4-6 may offer at least the following advantages: using the computer-implemented methods employing enhanced techniques as described above, images may be scored and evaluated in objective ways not otherwise achieved by human reviewers (gastroenterologists), at least for certain intestinal diseases, to date. This application of the enhanced techniques described herein therefore achieves an objective methodology and therefore a sound basis for efficiently observing, diagnosing, and treating patients having such intestinal diseases, avoiding costly and unreliable trial-and-error of conventional methods.

Orienting and Extracting a Region of Interest (Snippet) from an Image Frame

FIG. 7 shows an example 700 of identifying, orienting, and extracting at least one region of interest from an image frame, e.g., in the form of a snippet, according to some embodiments.

An image frame is shown in 710, where a certain edge value is identified as exceeding a predetermined threshold value at 712, having a strong edge value. A region of interest, in the form of a snippet, around the edge having the strong edge value may be extracted and/or oriented at 720. It can be appreciated that extraction and (re)orientation may occur in any order. In 730 and 740, further processing may refine the result further with respect to scoring, including for determining a prediction at the level of each individual snippet, and for purposes of considering multiple snippets in an image frame (see FIG. 8 below).

In 730, a color image (snippet) may be converted to a different color map, including grayscale. This conversion may be done in any number of ways, from linear flattening approximations to desaturation per color channel. One example implementation may be in the form of an "rgb2gray" function as part of various standard libraries for mathematical processing, for example. In some embodiments, a geometric mean may be used for converting color maps to grayscale, for example, which may yield improved contrast for some use cases.

In 740, image intensity of the snippet may be normalized. Normalization may be with respect to a curve (e.g., Gaussian distribution, Lorentzian distribution, etc.). In some embodiments, image intensity with respect to a snippet may refer to a disease severity prediction for each snippet. In some embodiments, image intensity may refer to a disease severity score for an entire image frame. In some embodiments, image intensity may refer to a specific image property, such as brightness or color saturation, for example.

Orienting and Extracting Multiple Regions of Interest (Snippets) from an Image Frame FIG. 8 shows an example 800 of identifying, orienting, and extracting multiple regions of interest from an image frame, in the form of snippets, according to some embodiments.

An image frame is shown in 810, where a certain edge value is identified as exceeding a predetermined threshold value at 822, 832, and 842, each having a strong edge value. For each of 822, 832, and 842, a respective region of interest in the form of a snippet 820, 830, and 840 may be extracted, (re)oriented, grayscaled, and/or normalized. Snippets 820, 830, and 840, among other possible snippets, may be evaluated individually, such as based on a first algorithm to generate a prediction per snippet. Based on a second algorithm, prediction scores may be weighted and combined to form a composite image score in the form of a single representative score assigned to the corresponding image frame as a whole, applying any of the enhanced techniques described herein.

Adaptive Sampling of Image Frames

FIG. 10 shows an example 1000 of reassigning scores of image frames that have already been scored, with respect to a PDF that is correlated with relative position, according to some embodiments.

In this example, relative position may be in terms of distance along a small intestine. Previously scored frames may correspond to positions along the small intestine, which may in turn correspond to probability values, in some embodiments. Performing a given algorithm, at least one processor 904 may calculate area under the curve (AUC) for the PDF, including AUC with respect to any given points, which may correspond to particular sample image frames and/or one of a minimum or maximum limit of the PDF or relative position (e.g., 0 or 1), according to some embodiments.

Following execution of the above given algorithm, in a given set of image frames, for any two points along the PDF having the greatest AUC between the points, another algorithm may evaluate a cost function on any intervening or adjacent sample image frames, with respect to an informativeness score already calculated based on the previously scored frames. Further detail about determining informativeness scores is described elsewhere herein, e.g., with respect to 504 of FIG. 5 above.

If the cost function determines that the AUC may be balanced more evenly across different (or differently scored) sample image frames, different (or differently scored) image frames may be selected as sample image frames for subsequent processing. Subsequent processing may include snippet selection, which may be carried out according to FIGS. 1-3, 7, 8, and 12 as further described herein, according to some embodiments.

Weighted Selection of Image Frames

Figure 11:
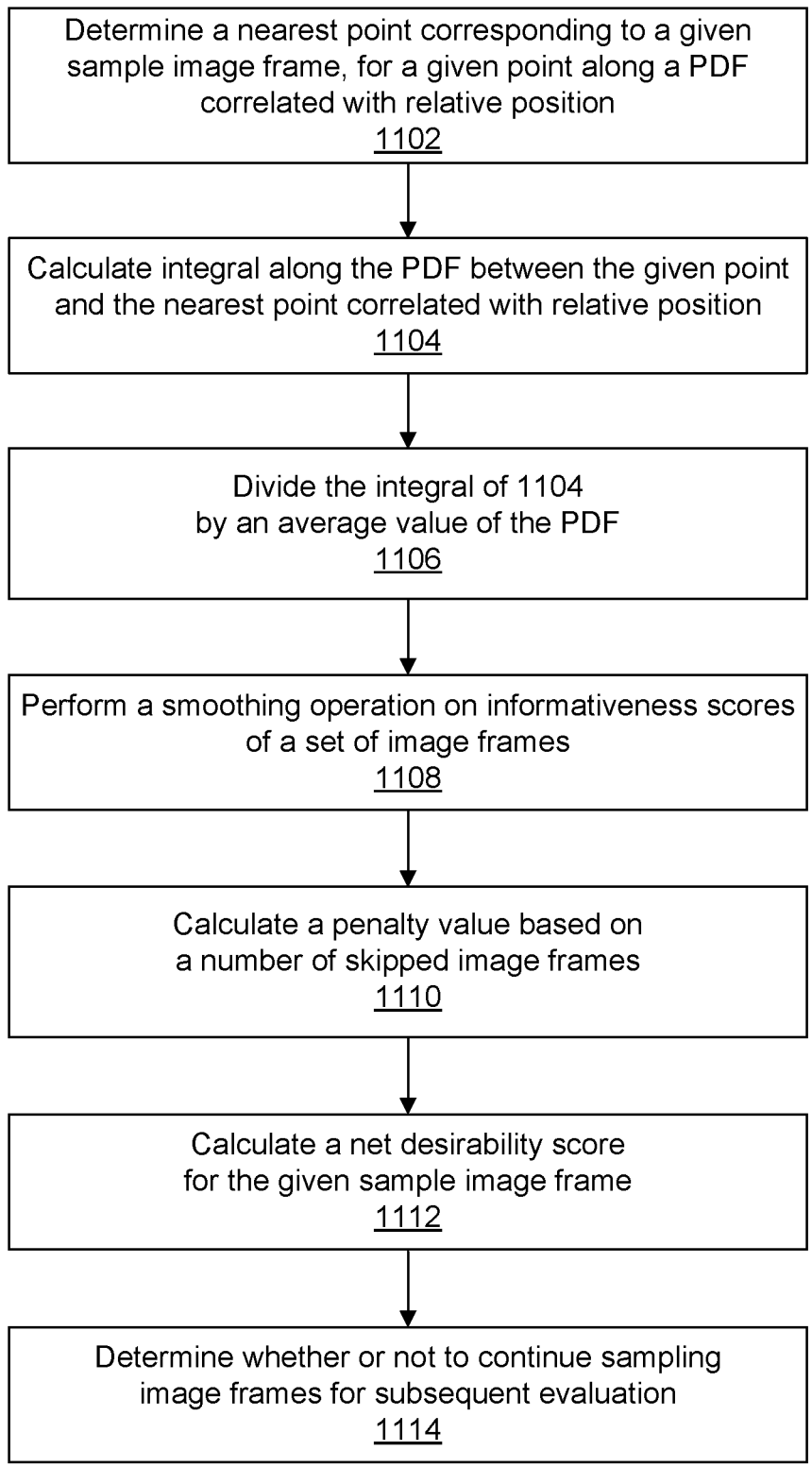
FIG. 11 is an example method for weighted selection of image frames, according to some embodiments.

FIG. 11 shows an example method 1100 for weighted selection of image frames, according to some embodiments. Method 1100 may be performed by processing logic that may comprise hardware (e.g., circuitry, dedicated logic, programmable logic, microcode, etc.), software (e.g., instructions executing on a processing device), or a combination thereof. Not all steps of method 1100 may be needed in all cases to perform the enhanced techniques disclosed herein. Further, some steps of method 1100 may be performed simultaneously, or in a different order from that shown in FIG. 11, as will be understood by a person of ordinary skill in the art.

Method 1100 shall be described with reference to FIGS. 9-11. However, method 1100 is not limited only to those example embodiments. The steps of method 1100 may be performed by at least one computer processor coupled to at least one memory device. An exemplary processor and memory device(s) are described below with respect to 904 of FIG. 9. In some embodiments, method 1100 may be performed using system 300 of FIG. 3, which may further include at least one processor and memory such as those of FIG. 9.

In 1102, at least one processor 904 may be configured, for a given point along a PDF correlated with relative position, to determine a nearest point corresponding to a given sample image frame of a set of image frames, where the given sample image frame is the sample image frame closest to the given point along the PDF correlated with relative position. An example of a PDF correlated with relative position is shown in FIG. 10, along with points corresponding to relative positions of sample image frames and correlated with probability values of the PDF. In some embodiments, not all points of relative position correspond to sample image frames, but any given point may have a nearest point corresponding to a sample image frame in a set of image frames, to the extent that the set of image frames is not empty.

In 1104, processor 904 may be configured to calculate an integral along the PDF between the given point and the nearest point corresponding to the given sample image frame (the closest sample image frame). Various integration techniques may be implement for performing 1104, including measuring AUC between designated points along the PDF.

In 1106, processor 904 may be configured to divide the integral resulting from 1104 by an average value of the PDF. In some embodiments, the average value may be the mean value of the PDF with respect to relative position of a given organ. In some embodiments, the average value may be a median value of the PDF. In some embodiments, the average value of the PDF may be calculated with respect to a given subset or range(s) of relative positions of the given organ (e.g., all but the proximal vigintile of the small intestine), depending on target symptoms to be measured or monitored, for example. The result of this division of 1106 may indicate a measure of probable benefit of the given sample image frame, based on the PDF with respect to relative position. This division may result in a normalized probable benefit measure (B) having a mean value of one, in some embodiments, and may depend on the PDF.

In 1108, processor 904 may perform a smoothing operation (e.g., linear transformation, matrix transformation, moving average, spline, filter, similar algorithm, or any combination thereof) on informativeness scores of a set of image frames, which may reassign an informativeness value of at least one image frame in the set of image frames. Processor 904, in the same operation or in a separate operation, may divide the informativeness score of the given sample image frame by the mean value of the scale on which the informativeness scores are assigned. For example, on an informativeness scale of zero to three, as discussed elsewhere herein, the mean value is 1.5. Division by the mean value, such as in 1108, may result in a normalized informativeness measure (I) with a mean value of one, in some embodiments, depending on overall informativeness of sample image frames available.

Nonlinear smoothing operations may reduce bias for selection of individual image frames, whereas linear smoothing operations may improve overall correlation for a given set of image frames, according to some embodiments. In some embodiments, removal of outlier frames, e.g., having convergence or divergence values beyond a predetermined threshold, may improve correlation of informativeness of remaining image frames. Additionally or alternatively, polynomial transformation, e.g., a second-order polynomial trained to relate average values to known curve values (e.g., PDF), may further improve correlation of remaining image frames. Polynomials of other orders may be used in other embodiments, for example.

In 1110, processor 904 may calculate a penalty value based on a number of skipped image frames for a given set of image frames or subset of image frames corresponding to a given region or range of relative values, for example. In some embodiments, the penalty may be calculated based on a Gaussian window having a width defined as a predetermined fraction of the measured range of relative positions (e.g., one-eighteenth of the small intestine), and having AUC defined as a calculated fraction (e.g., one-fiftieth) of the product of normalized measures of probable benefit and informativeness (e.g., B*I/50), in some embodiments. The calculated fraction may be a factor of total frames per sample image frame selected (e.g., one frame selected out of fifty frames). Other calculated or predetermined values may be used for other use cases, organs, and/or target symptoms, for example, according to various embodiments. The total calculated penalty value may be represented as P.

In 1112, processor 904 may calculate a net desirability score (N) for the given sample image frame. In some embodiments, the calculation of 1112 may evaluate N in N=B*I−P, where terms B, I, and P may be defined as describe above with respect to method 1100. In some embodiments, N may be calculated for each image frame in a set of image frames or a subset thereof, for example. In some cases, to facilitate spacing of representative samples, rounding of values of N may be performed to improve separation of sampled image frames and to decrease likelihood of over-fitting with predictive models based on the sampled image frames.

In 1114, processor 904 may determine whether or not to continue sampling image frames for subsequent evaluation (e.g., snippet selection). The determination of 1114 may involve one or more conditions, e.g., to evaluate whether or not a desired number of frames has been obtained, and/or whether the net desirability score for a set of image frames or subset thereof is within a prescribed range for acceptable samples.

Image Conversion and Reorientation with Selection of Regions of Interest

Figure 12:
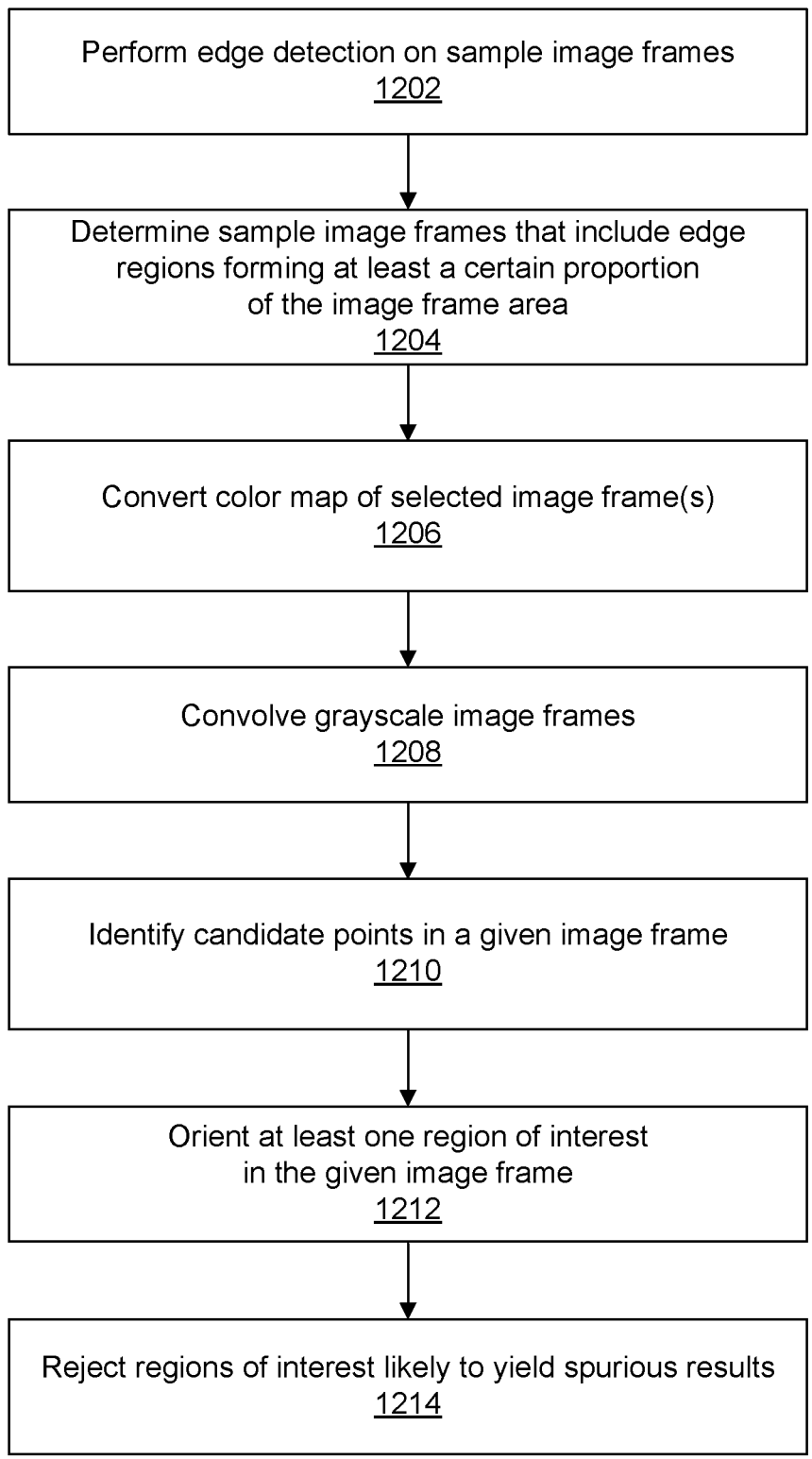
FIG. 12 is an example method for image conversion and reorientation with selection of regions of interest, according to some embodiments.

FIG. 12 shows an example method 1200 for image conversion and reorientation with selection of regions of interest, according to some embodiments. Method 1200 may be performed by processing logic that may comprise hardware (e.g., circuitry, dedicated logic, programmable logic, microcode, etc.), software (e.g., instructions executing on a processing device), or a combination thereof. Not all steps of method 1200 may be needed in all cases to perform the enhanced techniques disclosed herein. Further, some steps of method 1200 may be performed simultaneously, or in a different order from that shown in FIG. 12, as will be understood by a person of ordinary skill in the art.

Method 1200 shall be described with reference to FIGS. 2, 5, 7-9, and 12. However, method 1200 is not limited only to those example embodiments. The steps of method 1200 may be performed by at least one computer processor coupled to at least one memory device. An exemplary processor and memory device(s) are described below with respect to 904 of FIG. 9. In some embodiments, method 1200 may be performed using system 300 of FIG. 3, which may further include at least one processor and memory such as those of FIG. 9.

In 1202, at least one processor 904 may perform edge detection on a sample image frame of a set of sample image frames. Various edge detection techniques are described elsewhere herein. Edge detection as performed in 1202 may include, for example, use of random forest (RF) prediction, such as by a neural network. Edge detection as performed in 1202 may be part of an iterative process, either performed entirely in 1202 or split into multiple stages, some of which may be performed in 1202 and in other parts of method 1200, in some embodiments.

In 1204, processor 904 may, from the set of sample image frames, determine sample image frames that include edge regions forming at least a certain proportion of the image frame area, e.g., above a predetermined threshold. In some cases, processor 904 may select sample image frames if determined in 1204 to have at least 3% edge regions by frame area, ignoring or discarding sample image frames that have less than 3% edge regions by frame area. However, in other cases, where more samples may be needed, the threshold may be reduced in order to allow more frames to be processed, even if the frames have less edge-region area, according to an embodiment. Determinations of edge regions may result from processor 904 performing at least one specified probabilistic or randomized algorithm, e.g., data masking, simulated annealing, stochastic perturbation, approximation, optimization, or any combination thereof, to name a few non-limiting examples.

In 1206, processor 904 may convert a color map of at least one selected image frame, e.g., from color (pink-brown-green, red-green-blue, etc.) to grayscale, if the image frames include color. If the image frames are not already in color, 1206 may be skipped. To convert from color to grayscale, processor 904 may perform an algorithm that may remove color components from an original image (e.g., setting color saturation and hue values to zero). In some embodiments, grayscaled images may be encoded with color data corresponding to grayscale, e.g., for compatibility with certain formats, whereas other embodiments may work directly with gray image values, e.g., black and white luma or relative luminance values.

In some embodiments, red-green-blue (RGB) values may be averaged, e.g., summing RGB values and dividing by three. In some embodiments, weighted averages of RGB channels may be calculated, where relative luminance or intensity of each channel is used as a weighting value of each component for determining the weighted average of the RGB components as a whole. In some embodiments, conversion to grayscale may involve calculation of a geometric mean of RGB values, e.g., calculating luma based on $$\sqrt[3]{R*G*B}.$$

For purposes of edge detection and evaluating certain symptoms in certain organs, the geometric-mean method for grayscaling (conversion from color to grayscale) may yield improved contrast for improved reliability (and, by extension, reproducibility) of results. For other types of evaluation, e.g., different symptoms and/or different organs, other grayscaling methods may perform suitably for a given purpose.

In 1208, processor 904 may convolve grayscale image frames. The convolution of 1208 may identify or otherwise detect curved edges, folds, and/or other horizons in selected grayscale image frames. In some embodiments, depending on training of a CNN, for example, edge curves may be predicted successfully with relatively stable convergence. Such horizons (mucosal folds/edges) may be detected via algorithms that may convolve images filtered to monochrome (bi-level) with a 50% threshold (e.g., half-black, half-white) at different angles within the image, and/or by convolving a bright or dark line at different angles within the image. Depending on data present in a given set of image frames, convolution of 1208 may be skipped.

In 1210, processor 904 may identify candidate points in a given image frame, where candidate points are within edge regions having at least a predetermined minimum amount of spacing from each other. For example, the predetermined minimum amount of spacing may be in absolute terms (e.g., seven pixels); relative terms with respect to the containing image frame, resolution, number or density of pixels, etc. (e.g., 4% of the image frame); and/or statistical analysis of respective edge regions within the given image frame (e.g., standard deviations of edge properties, with candidate points having edge values at least one standard deviation above the average edge values of their respective edge regions); according to some embodiments.

Any minimum spacing criteria described above may thus limit the number of possible regions of interest (e.g., snippets) within any given image frame. As with the minimum thresholds for edge regions with respect to image frame area as determined in 1204, thresholds for minimum distance between candidate points or regions of interest may be reduced in 1210 if additional regions of interest may be needed or desired for a given use case. In some embodiments, each image frame in a set of image frames or a subset thereof, for example, candidate points may be evaluated for identifying candidate points, or at least until enough candidate points have been identified across enough samples in order to yield a likely reproducible result.

In 1212, processor 904 may orient (or reorient) at least one region of interest in the given image frame. Further examples of orienting or reorienting regions of interest are shown and described further above with respect to snippets (regions of interest) in FIGS. 2, 7, and/or 8. In some embodiments, which may include use cases of evaluating images taken from inside a small intestine to evaluate symptoms of celiac disease, for example, regions of interest (snippets) may be oriented or reoriented in a common direction relative to a common feature across the regions of interest, e.g., such that a section of the region of interest that depicts a mucosal wall is positioned at the bottom of each corresponding region of interest when the at least one region of interest is oriented or reoriented per 1212.

Examples of (re)oriented regions of interest (snippets) are shown in FIGS. 7 and 8, according to some embodiments. Orientation or reorientation may be iterated for each selected image frame of the set of image frames. Orientation or reorientation of 1212 may be skipped if regions of interest lack common features or a common strong vector, such as a feature (e.g., mucosa) accounting for at least 25% of the radius of a region of interest in any particular frame. Additionally or alternatively, 1212 may be skipped where rotationally invariant filters may be used for convolutions in multiple existing orientations, e.g., 8-way convolutions, according some embodiments.

In 1214, processor 904 may reject, ignore, or otherwise discard regions of interest likely to yield spurious results. For example, regions of interest that may contain artifacts such as air bubbles, bile flows, or blurry images, to name a few non-limiting examples, are likely to yield spurious results-rejecting such regions of interest may improve reproducibility of any monitoring or diagnosis resulting from evaluations or decisions made based on the remaining regions of interest in a given image frame or set of image frames. Examples of how processor 904 may identify regions of interest for rejection are described further above, such as with respect to 504 of FIG. 5.

Some non-limiting examples include processing using neural networks, RF algorithms, ML algorithms, etc., filtering regions with high-intensity channels over a given threshold, or filtering certain color balances or color gradients in corresponding original image frames, according to some embodiments. Additionally or alternatively, gradients may be averaged with a standard deviation of their Laplacian functions, e.g., to evaluate blur, for another metric by which to reject frames. PGB gradients, multi-channel intensity values, dark lines/edges detected, mucosal scores, and/or statistical analysis (e.g., mean, standard deviation, etc.) of intensity PDFs, or similar factors, may also be used as factors to determine whether or not to reject, ignore, or otherwise discard snippets or regions of interest, according to some embodiments.

Any or all of the above steps may be performed as part of snippet selection 240 as shown and described further above with respect to FIG. 2, in some embodiments. Additionally or alternatively, any or all of the above steps may be performed as part of processing demonstrated in FIGS. 5 and/or 7-9, for example.

Image Scoring and Presentation of Frames to Reduce Bias in Subsequent Scoring

Figure 13:
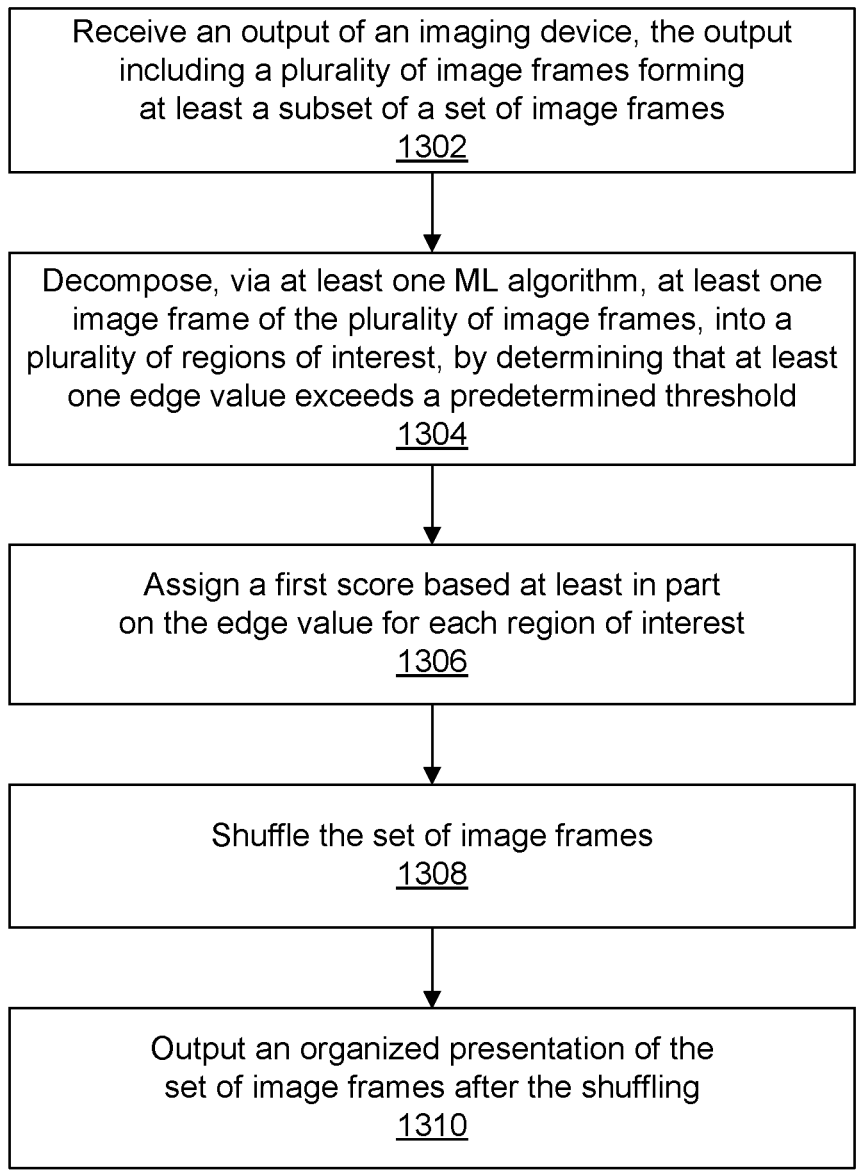
FIG. 13 is an example method for image scoring and presentation of frames to reduce bias in subsequent scoring, according to some embodiments.

FIG. 13 shows an example method 1300 for image scoring and presentation of frames to reduce bias in subsequent scoring, according to some embodiments. Method 1300 may be performed by processing logic that may comprise hardware (e.g., circuitry, dedicated logic, programmable logic, microcode, etc.), software (e.g., instructions executing on a processing device), or a combination thereof. Not all steps of method 1300 may be needed in all cases to perform the enhanced techniques disclosed herein. Further, some steps of method 1300 may be performed simultaneously, or in a different order from that shown in FIG. 13, as will be understood by a person of ordinary skill in the art.

Method 1300 shall be described with reference to FIGS. 9 and 13. However, method 1300 is not limited only to those example embodiments. The steps of method 1300 may be performed by at least one computer processor coupled to at least one memory device. An exemplary processor and memory device(s) are described below with respect to processor 904 of FIG. 9. In some embodiments, method 1300 may be performed using system 300 of FIG. 3, which may further include at least one processor and memory such as those of FIG. 9.

In 1302, at least one processor 904 may receive an output of an imaging device. The output of the imaging device may include image frames forming at least a subset of a set of image frames that may depict an inside surface of a digestive organ of a given patient, such as a small intestine for example. In some embodiments, not all image frames of the set may reliably depict the inside surface of the digestive organ, such as due to low quality of a given image frame (e.g., insufficient light, reflections, etc.), or obstructions between an image sensor and the inside surface (e.g., air bubbles, bile flows, etc.).

Members of the subset may be determined by whether a score exceeds a predetermined threshold, such as a first score as assigned in 1306 below, or a different score previously assigned, which may indicate reliability, informativeness, or other measures of a given image frame, for example. Additionally or alternatively, members of a subset may be determined by other factors, such as relative position, e.g., within the digestive organ, elapsed time, or other external metric, which may correlate with reliability or informativeness of corresponding image frames, such as likelihood of an image indicating a symptom of a given disease in the given patient, in some embodiments.

In 1304, processor 904 may automatically decompose at least one image frame of the plurality of image frames into a plurality of regions of interest via at least one machine learning (ML) algorithm. The at least one region of interest may be defined by determining, by processor 904, that an edge value (e.g., within each image frame of the at least one image frame) exceeds a predetermined threshold. The edge value may be determined via at least one type of edge-detection algorithm, and may be compared by processor 904 with the predetermined threshold. For a given edge having an edge value that exceeds the predetermined threshold, the region of interest may be defined by a radius or other perimeter around the vicinity of the edge, in some embodiments, having a shape and size that may conform to a minimum area, maximum percentage of a corresponding image frame's area, and/or proximity to another region of interest within the corresponding image frame, for example.

In 1306, processor 904 may automatically assign a first score based at least in part on the edge value for each region of interest as decomposed from at least one corresponding image frame as determined in 1304. Automatic assignment may be performed by at least one neural network, in some embodiments, which may implement at least one additional ML, algorithm, such as a random-forest regression, for example, as described further above. Automatic assignment of the first score may be in response to an event, such as edge detection, sequential processing of regions of interest, random processing of regions of interest, or the like.

The first score may be attributed to a corresponding image frame as a whole, in some embodiments, where the first score may be based on at least one region of interest in a corresponding image frame to represent informativeness, for example, of the entire corresponding image frame. In some embodiments, instances of the first score may be assigned automatically to each region of interest, for example, and a composite value of the first score may be calculated for a corresponding image frame.

In 1308, processor 904 may automatically shuffle the set of image frames. In some embodiments, shuffling may involve randomization, such as selection and/or ordering according to numbers generated by a pseudo-random number generator, for example. Some embodiments may implement shuffling methodically, according to at least one algorithm calculated to reduce bias in subsequent review and/or scoring of the subset of image frames.

For example, image frames that are members of the set of image frames but that are not members of the subset of image frames, or image frames having first scores below a predetermined threshold, may be methodically interspersed, in a fully automated manner, among other image frames having first scores that meet or exceed the predetermined threshold. In such embodiments, for example, a shuffling algorithm may thus prevent or otherwise interrupt relatively long sequences of image frames that may have scores above the threshold or below the threshold. By avoiding or breaking up such sequences, the shuffling algorithm may mitigate bias or fatigue that may arise from subsequent review and/or scoring by automated ML algorithms and/or manual human reviewers as a result of relatively long sequences of image frames above or below the predetermined threshold, according to some embodiments.

In 1310, processor 904 may output a presentation of the set of image frames after the shuffling. The presentation may be a visual display, such as a slide show having an presentation of shuffled image frames, where the automated presentation may be automatically advanced in an order of the shuffling, and where the automated presentation may be further arranged or presented according to additional organizational schemes, such as temporal intervals and/or positional spacing, for example. Additionally or alternatively, as a complement or substitute for any shuffling algorithm, the presentation may be organized in a way that may further mitigate bias and/or fatigue in subsequent review and/or scoring of the subset or set of image frames.

For example, an organized presentation of image frames may involve temporal spacing of when each of the image frames (or certain selected image frames) may be presented in a visual slide show, for example, by predetermined intervals, randomized intervals, or methodically separated intervals, such as with respect to display time or visual spacing (e.g., distance between concurrently displayed image frames) for any given image frames in sequence, according to some embodiments. As used here, "sequence" may indicate an order from one image frame to the next image frame in a shuffled deck of image frames, in some embodiments shuffled according to 1308 above, not necessarily in any predetermined sequence according to any output of the imaging device or digestive organ, for example. Other forms of organizing visual displays or other presentations of members of a set of image frames to mitigate bias and/or fatigue may be realized within the scope of this disclosure.

Some embodiments of method 1300 may further include assigning a second score to the presentation of the set of image frames. The second score may include, for example, a representation of severity of a symptom. In some embodiments, the second score may be assigned automatically via processor 904, for example, or manually via a reviewer evaluating the presentation of 1310.

Following method 1300, by assigning relevant values (e.g., edge values, scores, etc.), to pieces of information such as regions of interest, corresponding image frames, and/or (sub)sets of image frames, the information may be shuffled or otherwise rearranged, and presented in an organized fashion. Thus, the information may be recomposed in new and original ways with respect to displays of the same information.

Further iterations of method 1300 may be used to supervise or train at least one ML algorithm, based at least in part on the outputting of 1310. Supervision or training of the at least one ML algorithm may involve predefined start and end points for the output of the imaging device. Following sufficient supervision or training of the at least one ML algorithm, the at least one ML algorithm may perform method 1300 in a fully automated fashion, such as via at least one processor 904.

Example Computer System

Various embodiments may be implemented, for example, using one or more computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a bus or communication infrastructure 906.

Computer system 900 may also include user input/output device(s) 803, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. The GPU may be particularly useful in at least the image analysis and ML aspects described herein.

Additionally, one or more of processors 904 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or secondary memory 910. Secondary memory 910 may include, for example, a main storage drive 912 and/or a removable storage device or drive 914. Main storage drive 912 may be a hard disk drive or solid-state drive, for example. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communication path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 900 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving, via at least one processor, a set of image frames,
wherein at least a subset of the set of image frames depicts an inside surface of a digestive organ of a given patient; and
automatically assigning, via the at least one processor, a first score to each image frame of the set of image frames, the first score based on an edge value exceeding a predetermined threshold,
wherein the first score corresponds to an informativeness of the image frame with respect to a likelihood of the image frame depicting presence or absence of a given feature on the inside surface of the digestive organ, and wherein the feature is indicative of a disease;
extracting, via the at least one processor, a snippet from each frame of the set of image frames that has a score within a specified frame, each snippet encompassing the edge value exceeding the predetermined threshold;
orienting each snippet based on the edge value exceeding the predetermined threshold;
automatically assigning, via the at least one processor, a second score to each snippet,
wherein the second score corresponds to a severity of the disease; and
automatically arranging, via the at least one processor, the set of image frames according to at least one of the first score or the second score.

2. The method of claim 1, wherein the arranging comprises, with respect to at least one of the first score and the second score, at least one of the following:
ranking at least some image frames of the set of image frames in descending order of the first score or the second score;
ranking at least some image frames of the set of image frames in ascending order of the first score or the second score;
assorting at least some image frames of the set of image frames in random order of score; or
positioning at least some image frames of the set of image frames in an array based on adjacent image frames in the array having different scores, wherein a number of adjacent image frames in the array having different score values meets or exceeds a predetermined threshold.

3. The method of claim 2, further comprising:
automatically presenting to a reviewer, by the at least one processor, a first image frame of the set of image frames; and automatically presenting to the reviewer, by the at least one processor, a next image frame of the set of image frames, in the order in which the image frames were automatically arranged.

4. The method of claim 1, further comprising:
parsing metadata from each image frame of the set of image frames, wherein the metadata comprises at least one of a timestamp, a position, a relative position within the digestive organ, and at least one image property; and
based at least in part on the metadata, automatically selecting, by the at least one processor, at least one of the image frames from the set of image frames.

5. The method of claim 4, wherein the selecting further comprises, for a given image frame:
automatically determining, by the at least one processor, at least one of the following:
whether the first score or the second score fails to meet a predetermined threshold;
whether a visual artifact is determined to be present within the image frame;
whether timestamp metadata, position metadata, or relative position metadata indicates that the image frame depicts a sample for which image-based indicators are likely to be unreliable; or
whether a relative proximity of the given image frame to another image frame falls below a predetermined proximity threshold based on a difference in time, position, or relative position within the digestive organ; and
based on the determining, automatically removing, by the at least one processor, the given image frame from the set of image frames.

6. The method of claim 5, wherein the removing comprises relabeling the image frame such that the image frame is not treated as a member of the set of image frames.

7. The method of claim 5, wherein the given image frame is selected by at least one of:
sampling randomly, sampling by time, sampling by position, sampling by frequency, sampling by relative position, sampling by relative proximity, and sampling by change in value of the first score or the second score.

8. The method of claim 1, wherein the digestive organ comprises at least one of an esophagus, a stomach, a small intestine, and a large intestine.

9. The method of claim 1, wherein the set of image frames originated from at least one imaging device capable of image production and comprise at least one of the following:
photographic image frames, sonographic image frames, radiographic image frames, confocal image frames, or tomographic image frames.

10. The method of claim 9, wherein the at least one imaging device comprises at least one device selected from the group consisting of:
an ingestible camera, an endoscope, a celioscope, a laparoscope, an ultrasonic scanner, an X-ray detector, a computed tomography scanner, a positron emission tomography scanner, a magnetic resonance tomography scanner, an optical coherence tomography scanner, and a confocal microscope.

11. The method of claim 1, further comprising:
based on the first score or the second score, automatically generating, by the at least one processor, a diagnosis of the disease with respect to the digestive organ of the given patient.

12. The method of claim 11, wherein the diagnosis is generated in response to an observation of a reaction of the given patient to an irritant or in response to a treatment administered to the given patient with respect to the disease.

13. The method of claim 11, wherein the disease comprises at least one of Crohn's disease, celiac disease, irritable bowel syndrome, ulcerative colitis, or a combination thereof.

14. The method of claim 1, wherein the set of image frames comprises a plurality of homogeneous images.

15. The method of claim 1, wherein the assigning of at least the first score and the second score is performed following an algorithm that corresponds to at least one of a pattern-recognition algorithm, a classification algorithm, a machine-learning algorithm, or at least one artificial neural network.

16. The method of claim 15, wherein the at least one artificial neural network comprises at least one of a feedforward neural network, a recurrent neural network, a modular neural network, or a memory network.

17. The method of claim 16, wherein the feedforward neural network corresponds to at least one of a convolutional neural network, a probabilistic neural network, a time-delay neural network, a perceptron neural network, or an autoencoder.

18. A method comprising:
receiving, via at least one processor, a set of image frames,
wherein at least a subset of the set of image frames depicts an inside surface of a digestive organ of a given patient; and
automatically assigning, via the at least one processor, a first score to each image frame of the set of image frames, the first score based on an edge value exceeding a predetermined threshold,
wherein the first score quantifies a likelihood of the image frame depicting presence or absence of a given feature on the inside surface of the digestive organ, and is used to assess a disease state of a small-bowel enteropathy;
extracting, via the at least one processor, a snippet from each frame of the set of image frames that has a score within a specified frame, each snippet encompassing the edge value exceeding the predetermined threshold;
orienting each snippet based on the edge value exceeding the predetermined threshold;
automatically assigning, via the at least one processor, a second score to each snippet, wherein the second score corresponds to a severity of the disease state; and
automatically arranging, via the at least one processor, the set of image frames according to the second score.

19. The method of claim 18, further comprising:
monitoring, via the at least one processor, disease worsening or disease improvement using the second score.

20. The method of claim 18, further comprising:
automatically arranging, via the at least one processor, the set of image frames according to at least one of the second score to quantify an extent of disease effect over a portion of the digestive organ.

* * * * *

UNITED STATES PATENT AND TRADEMARK OFFICE
CERTIFICATE OF CORRECTION

| | |
|---|---|
| PATENT NO. | : 12,094,109 B2 |
| APPLICATION NO. | : 17/286224 |
| DATED | : September 17, 2024 |
| INVENTOR(S) | : Uday Veer Manish Bangia et al. |

It is certified that error appears in the above-identified patent and that said Letters Patent is hereby corrected as shown below:

In the Specification

Column 40
Line 65-66, "$N$in $N = B * I - P$" should be --$N$ in $N = B * I - P$--

Page 1 of 1

Signed and Sealed this
Fifteenth Day of October, 2024

*Katherine Kelly Vidal*

Katherine Kelly Vidal
*Director of the United States Patent and Trademark Office*